US007736816B2

(12) United States Patent
Yoshitomi et al.

(10) Patent No.: US 7,736,816 B2
(45) Date of Patent: Jun. 15, 2010

(54) FUEL CELL STACK

(75) Inventors: Ryoichi Yoshitomi, Utsunomiya (JP);
Ayumu Ishizuka, Utsunomiya (JP);
Makoto Tsuji, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 89 days.

(21) Appl. No.: 12/005,007

(22) Filed: Dec. 20, 2007

(65) Prior Publication Data

US 2008/0152991 A1    Jun. 26, 2008

(30) Foreign Application Priority Data

Dec. 22, 2006    (JP)    ............... 2006-346700

(51) Int. Cl.
*H01M 2/00*    (2006.01)
*H01M 2/02*    (2006.01)

(52) U.S. Cl. .............. 429/463; 429/510; 429/511; 429/507; 429/508

(58) Field of Classification Search ............... 429/13, 429/32, 34–37; 403/187–188, 197; 16/221, 16/252, 260, 261, 264, 265; 219/121.63, 219/121.64, 121.14, 121.85
See application file for complete search history.

(56) References Cited

U.S. PATENT DOCUMENTS

| | | | | |
|---|---|---|---|---|
| 4,598,889 A | * | 7/1986 | Remington | ............ 244/87 |
| 4,682,002 A | * | 7/1987 | Delle Piane et al. | ..... 219/121.64 |
| 5,429,417 A | * | 7/1995 | Kim | ................ 297/440.1 |
| 6,855,448 B2 | | 2/2005 | Kikuchi et al. | |
| 2005/0019643 A1 | | 1/2005 | Sugita et al. | |
| 2006/0068264 A1 | * | 3/2006 | Ishizuka et al. | ............ 429/37 |
| 2007/0054172 A1 | * | 3/2007 | Ueda | ................ 429/34 |

FOREIGN PATENT DOCUMENTS

| | | |
|---|---|---|
| JP | 2002-298901 | 10/2002 |
| JP | 2006-100075 | 4/2006 |
| JP | 2007220331 A * | 8/2007 |

OTHER PUBLICATIONS

European Search Report for Application No. 07024013.0, dated May 28, 2008.

* cited by examiner

*Primary Examiner*—Jerry Lorengo
*Assistant Examiner*—Heng M Chan
(74) *Attorney, Agent, or Firm*—Lahive & Cockfield, LLP; Anthony A. Laurentano

(57) ABSTRACT

A fuel cell stack includes a stack body formed by stacking a plurality of unit cells in a horizontal direction. The stack body is held in a casing including end plates. Further, the casing includes a plurality of side plates provided on sides of the stack body. The end plates and the side plates are coupled by coupling pins. Each of the side plates has a plurality of separate second coupling portions, and the coupling pins are inserted into the coupling portions.

7 Claims, 42 Drawing Sheets

US 7,736,816 B2

FUEL CELL STACK

BACKGROUND OF THE INVENTION

1. Field of the Invention

The present invention relates to a fuel cell stack including a stack body formed by stacking a plurality of unit cells and a box-shaped casing containing the stack body. Each of the unit cells includes an electrolyte electrode assembly and separators sandwiching the electrolyte electrode assembly. The electrolyte electrode assembly includes a pair of electrodes and an electrolyte interposed between the electrodes.

2. Description of the Related Art

For example, a polymer electrolyte fuel cell employs an electrolyte membrane (electrolyte) comprising a polymer ion exchange membrane. The electrolyte membrane is interposed between an anode and a cathode to form a membrane electrode assembly. The membrane electrode assembly is sandwiched between separators to form a fuel cell.

In use, normally, a predetermined number (e.g., several tens to several hundreds) of fuel cells are stacked together as a fuel cell stack to achieve the desired power generation performance. In the fuel cell stack, in order to prevent the increase in the internal resistance of the fuel cells, and prevent degradation in the sealing performance for reactant gases, the fuel cells need to be held together reliably under pressure.

In this regard, for example, a fuel cell stack disclosed in Japanese Laid-Open Patent Publication No. 2002-298901 is known. The fuel cell stack has a stack body formed by connecting a predetermined number of unit cells electrically in series. Each of the unit cells includes an assembly including a cathode, an anode, and an electrolyte interposed between the cathode and the anode, and a pair of separators sandwiching the assembly. The separators have a fuel gas flow field for supplying a fuel gas to the anode, and an oxygen-containing gas flow field for supplying an oxygen-containing gas to the cathode. Current collecting electrodes are provided outside the stack body, and end plates are provided outside the current collecting electrodes. The stack body and the current collecting electrodes are placed in a casing having at least one detachable side surface. An opening at the end of the casing is connected to the end plate by a hinge mechanism.

In the hinge mechanism, a plurality of cylindrical insertion portions are provided in a mounting plate such as the end plate and the casing, and coupling pins are integrally inserted into the cylindrical insertion portions. Thus, a process of forming a plurality of cylindrical insertion portions integrally with the mounting plate is performed, and operation of fabricating the mounting plate is complicated. Further, it is necessary to achieve the desired fabrication accuracy. Consequently, the overall cost for producing the fuel cell stack is considerably high.

SUMMARY OF THE INVENTION

A main object of the present invention is to provide a fuel cell stack which makes it possible to suitably and economically provide a plurality of cylindrical insertion portions for insertion of coupling pins, and easily adopt various joining methods.

The present invention relates to a fuel cell stack including a stack body formed by stacking a plurality of unit cells and a box-shaped casing containing the stack body. Each of the unit cells includes an electrolyte electrode assembly and separators sandwiching the electrolyte electrode assembly. The electrolyte electrode assembly includes a pair of electrodes and an electrolyte interposed between the electrodes.

The casing comprises end plates provided at opposite ends of the stack body in the stacking direction, a plurality of side plates provided on sides of the stack body, and coupling pins coupling the end plates and the side plates. Separate cylindrical insertion portions are fixed separately to at least the side plates or the end plates for inserting the coupling pins into the cylindrical insertion portions.

In the present invention, a plurality of separate cylindrical insertion portions are separately provided, and coupling pins are inserted into the cylindrical insertion portions. The cylindrical insertion portions are fixed separately to at least side plates or end plates. In the structure, in comparison with the structure in which a plurality of insertion portions are produced into one piece, the production cost is reduced significantly. Further, while achieving the effective reduction in the cost, various changes can be made in the joining method of cylindrical insertion portions. Thus, hinge structure (coupling structure using the coupling pins) which achieves the optimum joining state in respect of material, accuracy, and the required strength can be obtained.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
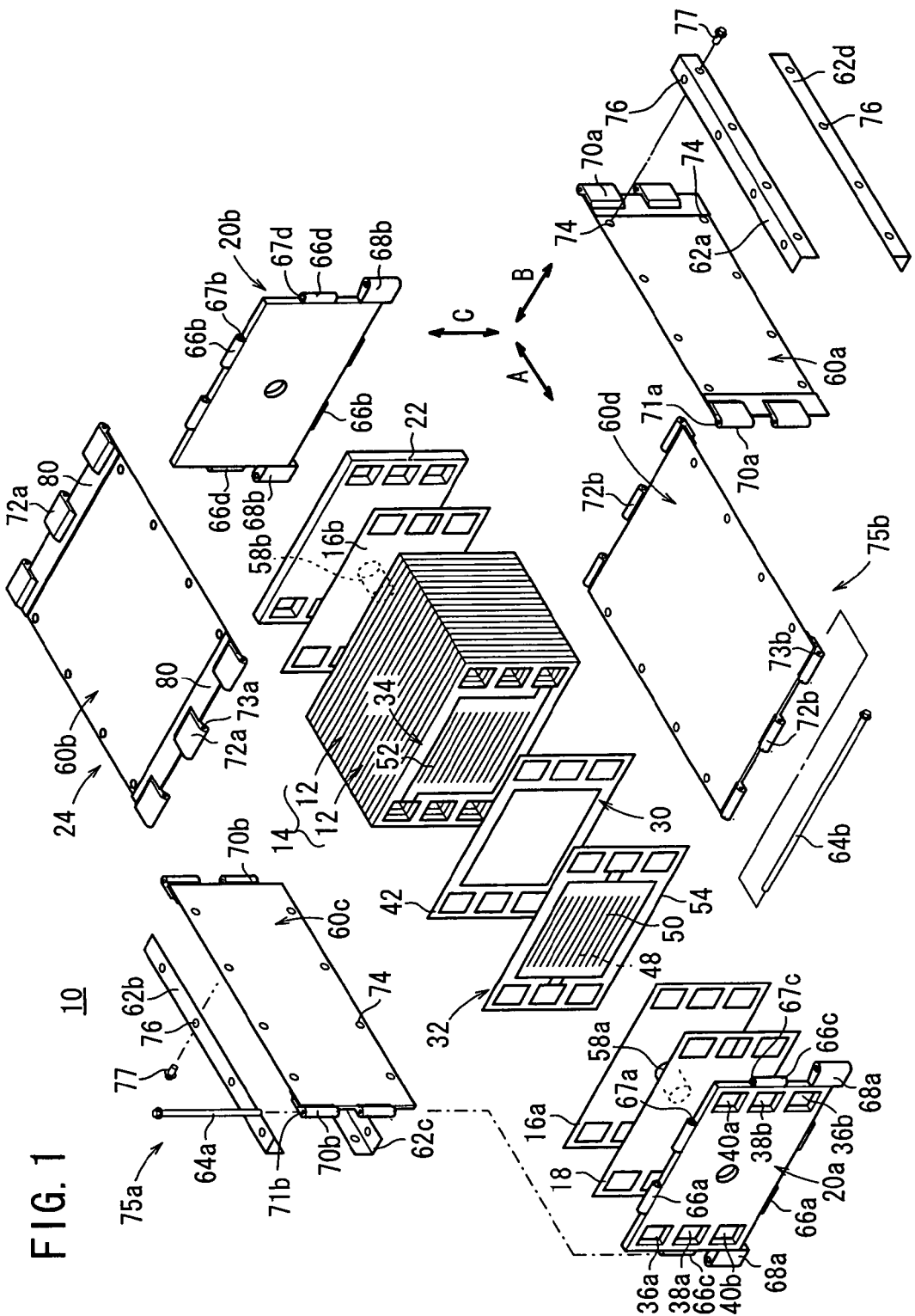
FIG. 1 is a partial exploded perspective view showing a fuel cell stack according to the first embodiment of the present invention.
Figure 2:
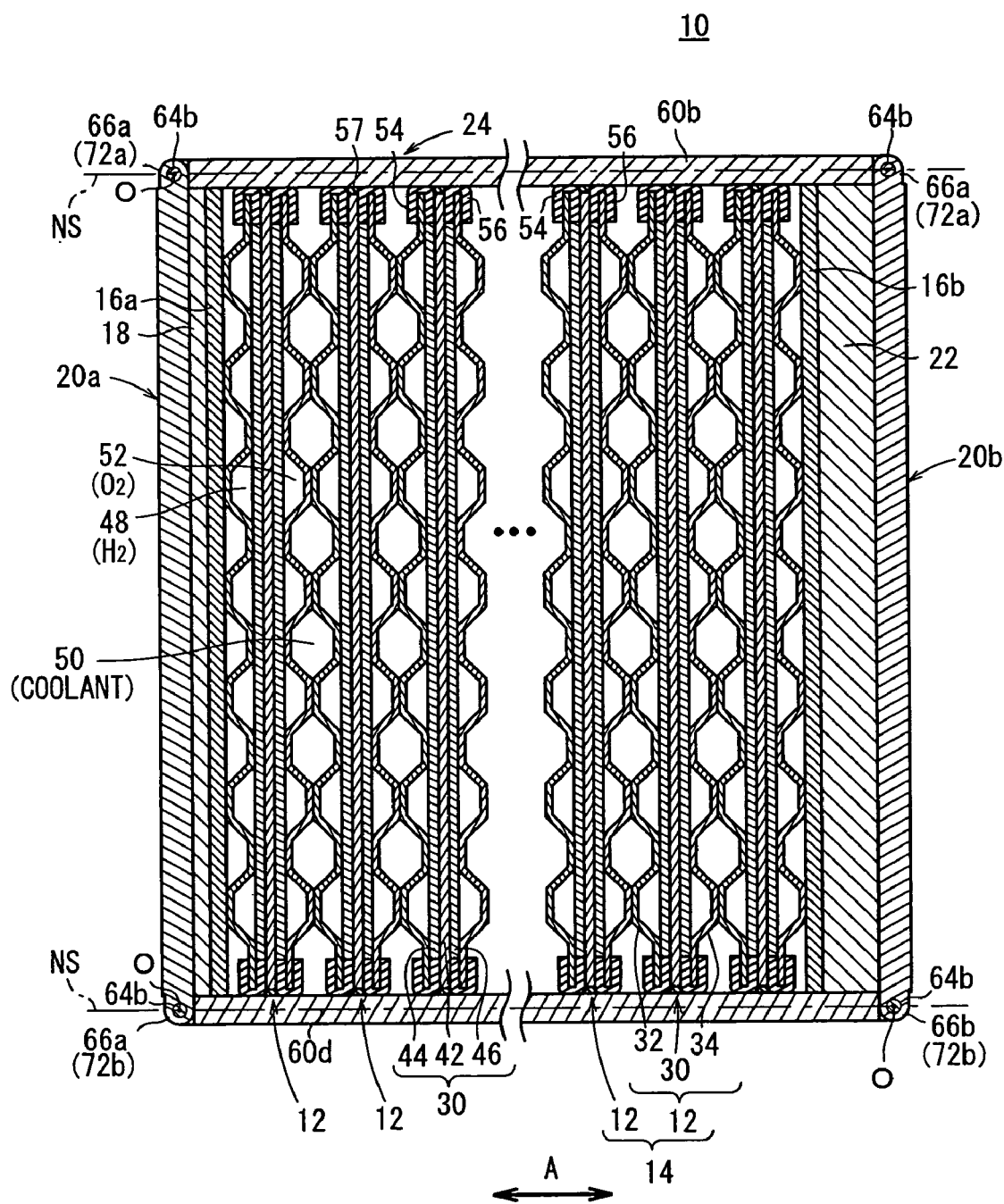
FIG. 2 is a cross sectional side view showing the fuel cell stack.

FIG. 1 is a partial exploded perspective view showing a fuel cell stack 10 according to the first embodiment of the present invention. FIG. 2 is a cross sectional side view showing the fuel cell stack 10.

The fuel cell stack 10 includes a stack body 14 formed by stacking a plurality of unit cells 12 in a horizontal direction indicated by an arrow A. At one end of the stack body 14 in the stacking direction indicated by the arrow A, a terminal plate 16a is provided. An insulating plate 18 is provided outside the terminal plate 16a, and an end plate 20a is provided outside the insulating plate 18. At the other end of the stack body 14 is the stacking direction, a terminal plate 16b is provided. An insulating spacer member 22 (instead of the insulating spacer member, the insulating plate 18 may be used) is provided outside the terminal plate 16b, and an end plate 20b is provided outside the insulating spacer member 22. For example, the fuel cell stack 10 is integrally provided in a casing 24 including the end plates 20a, 20b having a rectangular shape.

Figure 3:
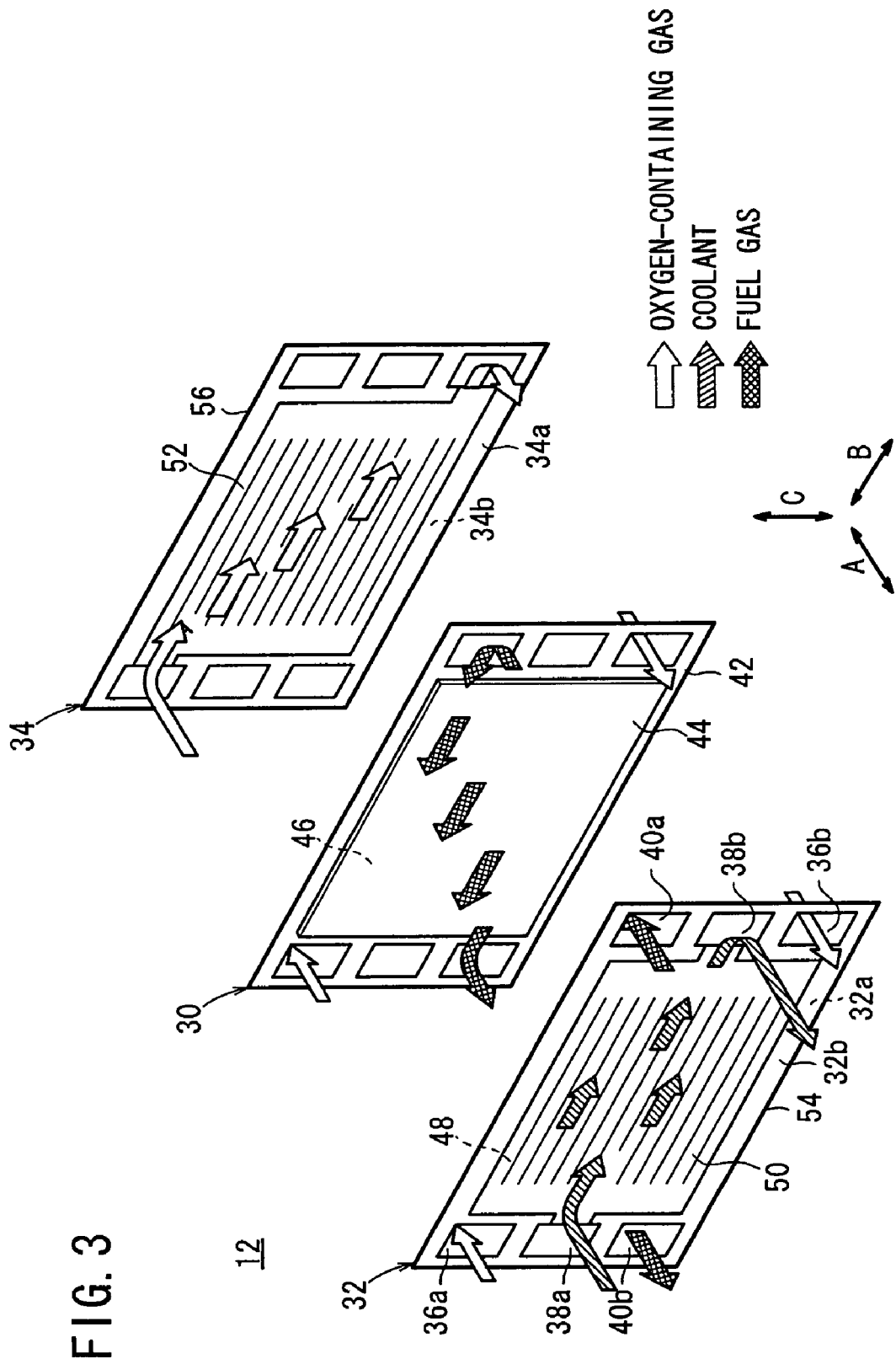
FIG. 3 is an exploded perspective view showing a unit cell of the fuel cell stack.

As shown in FIGS. 2 and 3, each of the unit cells 12 includes a membrane electrode assembly (electrolyte electrode assembly) 30 and first and second metal separators 32, 34 sandwiching the membrane electrode assembly 30. The first and second metal separators 32, 34 are thin metal plates fabricated to have corrugated surfaces. Instead of the first and second metal separators 32, 34, for example, carbon separators may be used.

At one end of the unit cell 12 in the longitudinal direction indicated by an arrow B in FIG. 3, an oxygen-containing gas supply passage 36a for supplying an oxygen-containing gas, a coolant supply passage 38a for supplying a coolant, and a fuel gas discharge passage 40b for discharging a fuel gas such as a hydrogen-containing gas are provided. The oxygen-containing gas supply passage 36a, the coolant supply passage 38a, and the fuel gas discharge passage 40b extend through the unit cell 12 in the direction indicated by the arrow A.

At the other end of the unit cell 12 in the longitudinal direction, a fuel gas supply passage 40a for supplying the fuel gas, a coolant discharge passage 38b for discharging the coolant, and an oxygen-containing gas discharge passage 36b for discharging the oxygen-containing gas are provided. The fuel gas supply passage 40a, the coolant discharge passage 38b, and the oxygen-containing gas discharge passage 36b extend through the unit cell 12 in the direction indicated by the arrow A.

The membrane electrode assembly 30 includes an anode 44, a cathode 46, and a solid polymer electrolyte membrane 42 interposed between the anode 44 and the cathode 46. The solid polymer electrolyte membrane 42 is formed by impregnating a thin membrane of perfluorosulfonic acid with water, for example.

Each of the anode 44 and the cathode 46 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 44 and the electrode catalyst layer of the cathode 46 are fixed to both surfaces of the solid polymer electrolyte membrane 42, respectively.

The first metal separator 32 has a fuel gas flow field 48 on its surface 32a facing the membrane electrode assembly 30. The fuel gas flow field 48 is connected to the fuel gas supply passage 40a at one end, and connected to the fuel gas discharge passage 40b at the other end. The fuel gas flow field 48 includes a plurality of grooves extending in the direction indicated by the arrow B. The first metal separator 32 has a coolant flow field 50 on a surface 32b opposite to the surface 32a. The coolant flow field 50 is connected to the coolant supply passage 38a at one end, and the coolant discharge passage 38b at the other end. The coolant flow field 50 includes a plurality of grooves extending in the direction indicated by the arrow B.

The second metal separator 34 has an oxygen-containing gas flow field 52 on its surface facing the membrane electrode assembly 30. The oxygen-containing gas flow field 52 is connected to the oxygen-containing gas supply passage 36a at one end, and connected to the oxygen-containing gas discharge passage 36b at the other end. The oxygen-containing gas flow field 52 includes a plurality of grooves extending in the direction indicated by the arrow B. A surface 34b of the second metal separator 34 is overlapped with the surface 32b of the first metal separator 32 to form the coolant flow field 50.

A first seal member 54 is formed integrally on the surfaces 32a, 32b of the first metal separator 32 around the outer end of the first metal separator 32. The first seal member 54 is formed around the fuel gas supply passage 40a, the fuel gas discharge passage 40b, and the fuel gas flow field 48 on the surface 32a of the first metal separator 32 such that the fuel gas flow field 48 is connected to the fuel gas supply passage 40a and the fuel gas discharge passage 40b. The first seal member 54 is formed around the coolant supply passage 38a, the coolant discharge passage 38b, and the coolant flow field 50 on the surface 32b of the first metal separator 32 such that the coolant flow field 50 is connected to the coolant supply passage 38a and the coolant discharge passage 38b.

Further, a second seal member 56 is formed integrally on the surfaces 34a, 34b of the second metal separator 34 around the outer end of the second metal separator 34. The second seal member 56 is formed around the oxygen-containing gas supply passage 36a, the oxygen-containing gas discharge passage 36b, and the oxygen-containing gas flow field 52 on the surface 34a of the second metal separator 34 such that the oxygen-containing gas flow field 52 is connected to the oxygen-containing gas supply passage 36a and the oxygen-containing gas discharge passage 36b. The second seal member 56 is formed around the coolant supply passage 38a, the coolant discharge passage 38b, and the coolant flow field 50 on the surface 34b of the second metal separator 34 such that the coolant flow field 50 is connected to the coolant supply passage 38a and the coolant discharge passage 38b.

As shown in FIG. 2, a seal 57 is interposed between the first and the second seal members 54, 56 for preventing the outer end of the solid polymer electrolyte membrane 42 from directly contacting the casing 24.

As shown in FIG. 1, a rod shaped terminal 58a is provided at substantially the center of the terminal plate 16a, and a rod shaped terminal 58b is provided at substantially the center of the terminal plate 16b. For example, a load such as a travel motor is connected to the terminals 58a, 58b.

As shown in FIG. 1, the casing 24 includes the end plates 20a, 20b, a plurality of side plates 60a to 60d, angle members (e.g., L angles) 62a to 62d, and coupling pins 64a, 64b. The side plates 60a to 60d are provided on sides of the stack body 14. The angle members 62a to 62d are used for coupling adjacent ends of the side plates 60a to 60d. The coupling pins 64a, 64b are used for coupling the end plates 20a, 20b and the side plates 60a to 60d. The coupling pins 64b are longer than the coupling pins 64a. For example, the side plates 60a to 60d are thin metal plates.

Each of upper and lower ends of the end plate 20a has two first projecting coupling portions 66a (cylindrical insertion portion). Each of upper and lower ends of the end plate 20b has two first projecting coupling portions 66b (cylindrical insertion portion). Each of left and right ends of the end plate 20a has one first projecting coupling portion 66c (cylindrical insertion portion). Each of left and right ends of the end plate 20b has one first projecting coupling portion 66d (cylindrical insertion portion). The first projecting coupling portions 66a to 66d have through-holes 67a to 67d, respectively. The end plate 20a has mounting bosses 68a on its left and right ends at lower positions. The end plate 20b has mounting bosses 68b on its left and right ends at lower positions. The bosses 68a, 68b are fixed to mounting positions (not shown) using bolts or the like for installing the fuel cell stack 10 in a vehicle, for example.

The side plates 60a, 60c are provided on opposite sides of the stack body 14 in the lateral direction indicated by the arrow B. Each longitudinal end of the side plate 60a in the longitudinal direction indicated by the arrow A has two second coupling portions (cylindrical insertion portions) 70a. Each longitudinal end of the side plate 60c has two second coupling portions (cylindrical insertion portions) 70b. The side plate 60b is provided on the upper side of the stack body 14, and the side plate 60d is provided on the lower side of the stack body 14. Each longitudinal end of the side plate 60b has three second coupling portions 72a. Each longitudinal end of the side plate 60d has three second coupling portions 72b. The second coupling portions 70a, 70b have holes 71a, 71b, and the second coupling portions 72a, 72b have holes 73a, 73b.

The first coupling portions 66c of the end plate 20a, and the first coupling portions 66b of the end plate 20b are positioned between the second coupling portions 70a of the side plate 60a, and between the second coupling portions 70b of the side plate 60c. The short coupling pins 64a are inserted into these coupling portions 66c, 66d, 70a, 70b to form first hinge structure 75a for coupling the side plates 60a, 60c, and the end plates 20a, 20b.

Likewise, the second coupling portions 72a of the side plate 60b and the first coupling portions 66a, 66b of the upper end of the end plates 20a, 20b are positioned alternately, and the second coupling portions 72b of the side plate 60d and the first coupling portions 66a, 66b of the lower end of the end plates 20a, 20b are positioned alternately. The long coupling pins 64b are inserted into these coupling portions 66a, 66b, 72a, 72b to form second hinge structure 75b for coupling the side plates 60b, 60d and the end plates 20a, 20b.

A plurality of screw holes 74 are formed along opposite edges of the side plates 60a to 60d in the lateral direction. The screw holes 74 are arranged in the direction indicated by the arrow A. Further, holes 76 are provided along the lengths of the angle members 62a to 62d at positions corresponding to the screw holes 74. Screws 77 are inserted into the holes 76 and the screw holes 74. Thus, the side plates 60a to 60d are fixed together using the angle members 62a to 62d. In this manner, the side plates 60a to 60d, and the end plates 20a, 20b are assembled into the casing 24 (see FIG. 4).

The angle members 62a to 62d may have screw holes, and the side plates 60a to 60d may have holes. In this case, the angle members 62a to 62d are placed inside the side plates 60a to 60d for fixing the angle members 62a to 62d and the side plates 60a to 60d together.

Figure 5:
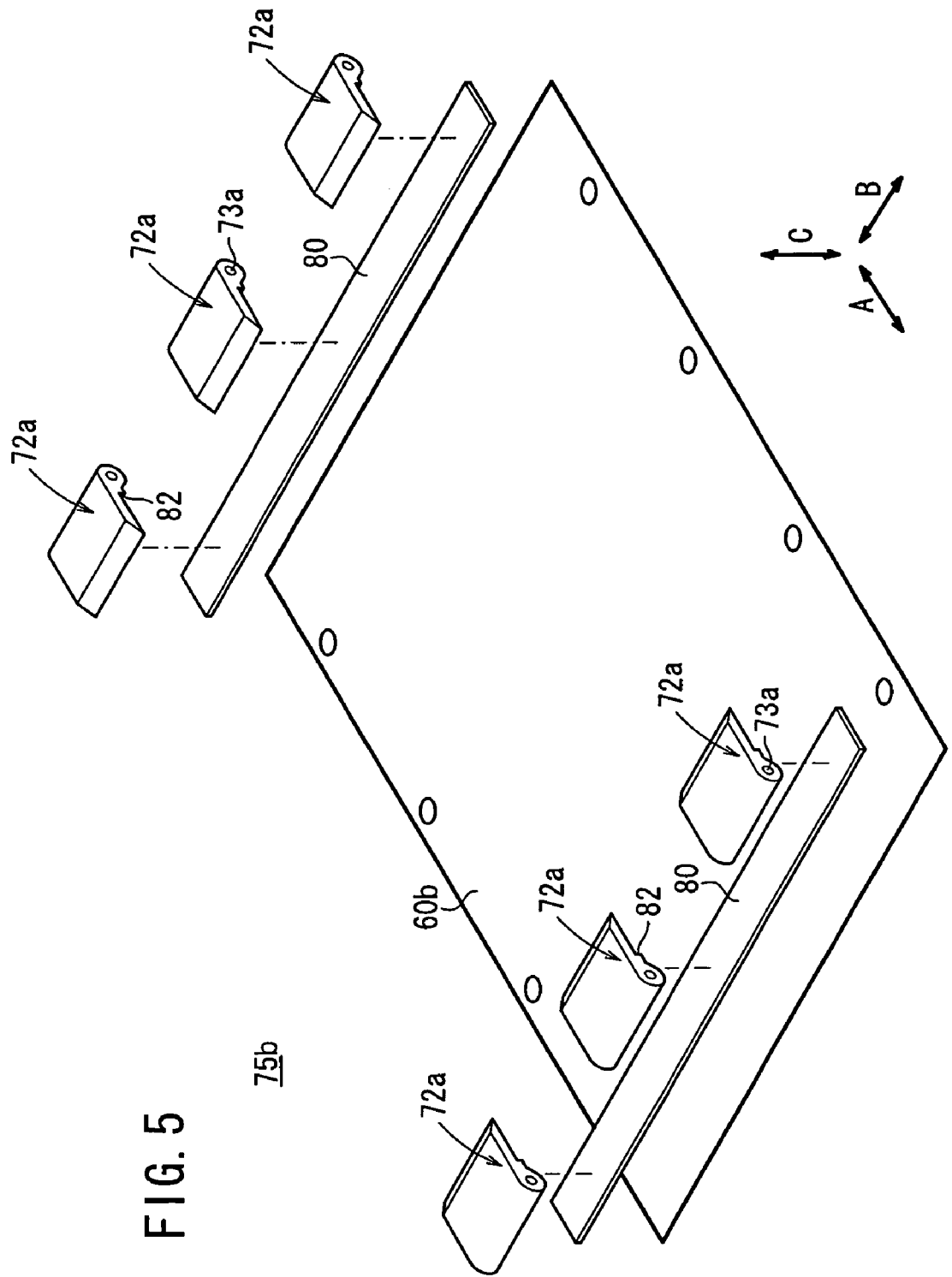
FIG. 5 is an exploded perspective view showing a side plate of a casing.
Figure 6:
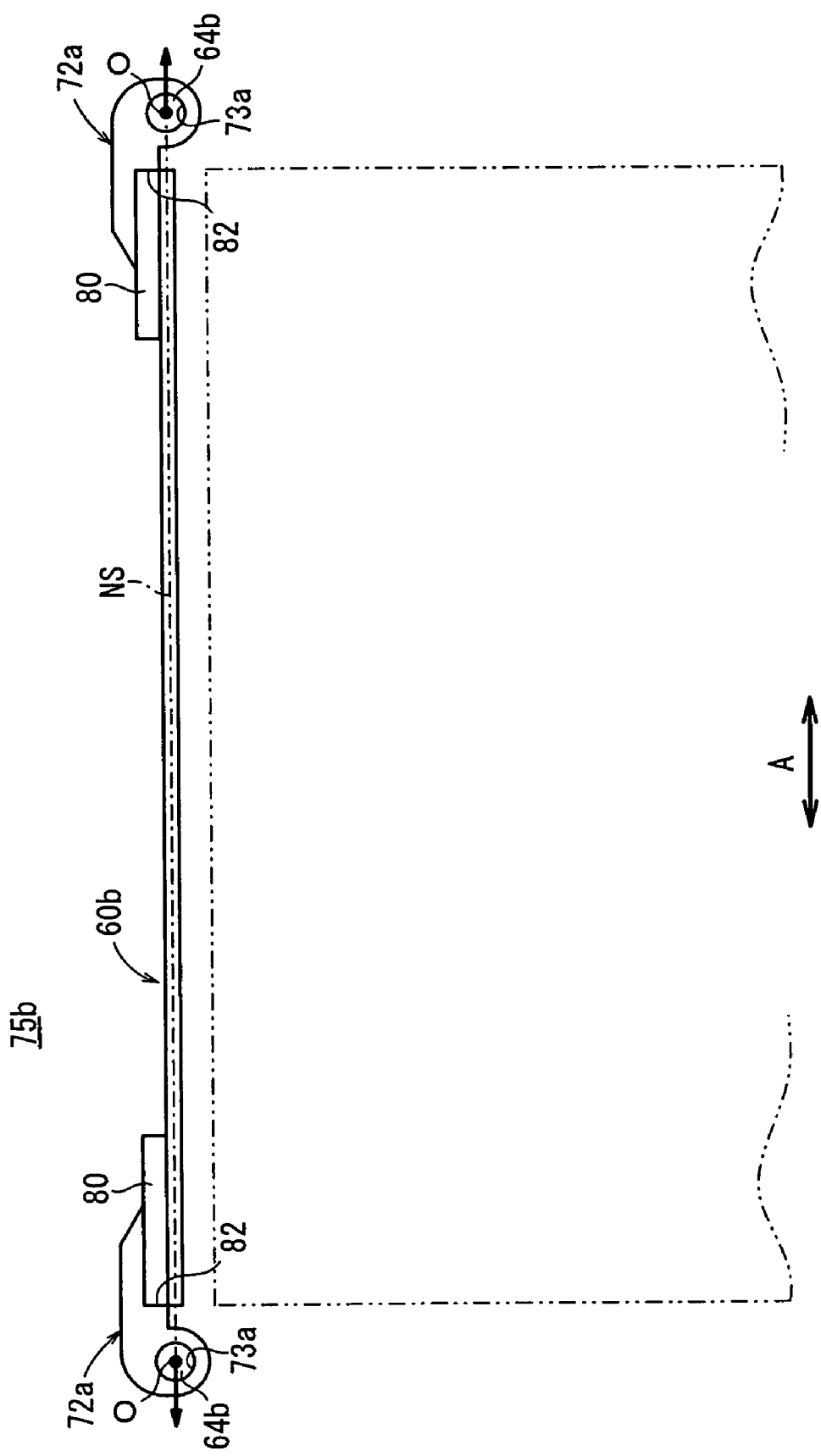
FIG. 6 is a view showing the side plate.

As shown in FIGS. 5 and 6, mounting plate members 80 are fixed to the side plate 60b. The mounting plate members 80 are thicker than the side plate 60b. The three separate coupling portions 72a are joined to each of the mounting plate members 80 for inserting the coupling pins 64b. If the joining strength, the shape, or the like can be maintained, the second coupling portions 72a may be joined to the side plate 60b directly. Second to 32nd embodiments as described later may be modified in the same manner.

The second coupling portion 72a can be fabricated using various materials, and using various methods. For example, in the case where material of the second coupling portion 72a is iron and steel material such as SUS material, the second coupling portion 72a can be produced by powder metallurgy, MIM (metal injection molding), sintering, forging, drawing or the like. In the case where material of the second coupling portion 72a is metal material such as aluminum, the second coupling portion 72a can be produced by die casting, molding, extrusion, or the like. In the case where material of the second coupling portion 72a is resin or the like, the second coupling portion 72a can be formed by injection molding, extrusion, cast molding or the like.

Each of the second coupling portions 72a can be joined to the mounting plate member 80 using various joining methods. For example, welding techniques such as gas welding, resistance welding, and friction welding, brazing welding using copper, silver or stainless steel, and adhesives such as epoxy resin may be adopted for joining the second coupling portion 72a.

The second coupling portion 72a has a step 82 which contacts an end of the mounting plate member 80 for positioning the second coupling portion 72a and the mounting plate member 80 relative to each other. As shown in FIG. 6, the center O of the hole 73a of the second coupling portion 72a is positioned on a neutral surface NS of the side plate 60b, for preventing a bending force from being applied to the side plate 60d, since a load in the direction indicated by the A is applied to the pair of the coupling pins 64b.

As shown in FIG. 1, the side plates 60a, 60c, and 60d, have the same structure as the side plate 60b, and detailed description of the side plates 60a, 60c, and 60d is omitted. Further, as necessary, the end plates 20a, 20b have the same structure as the side plate 60b.

Next, operation of the fuel cell stack 10 will be described.

Figure 4:
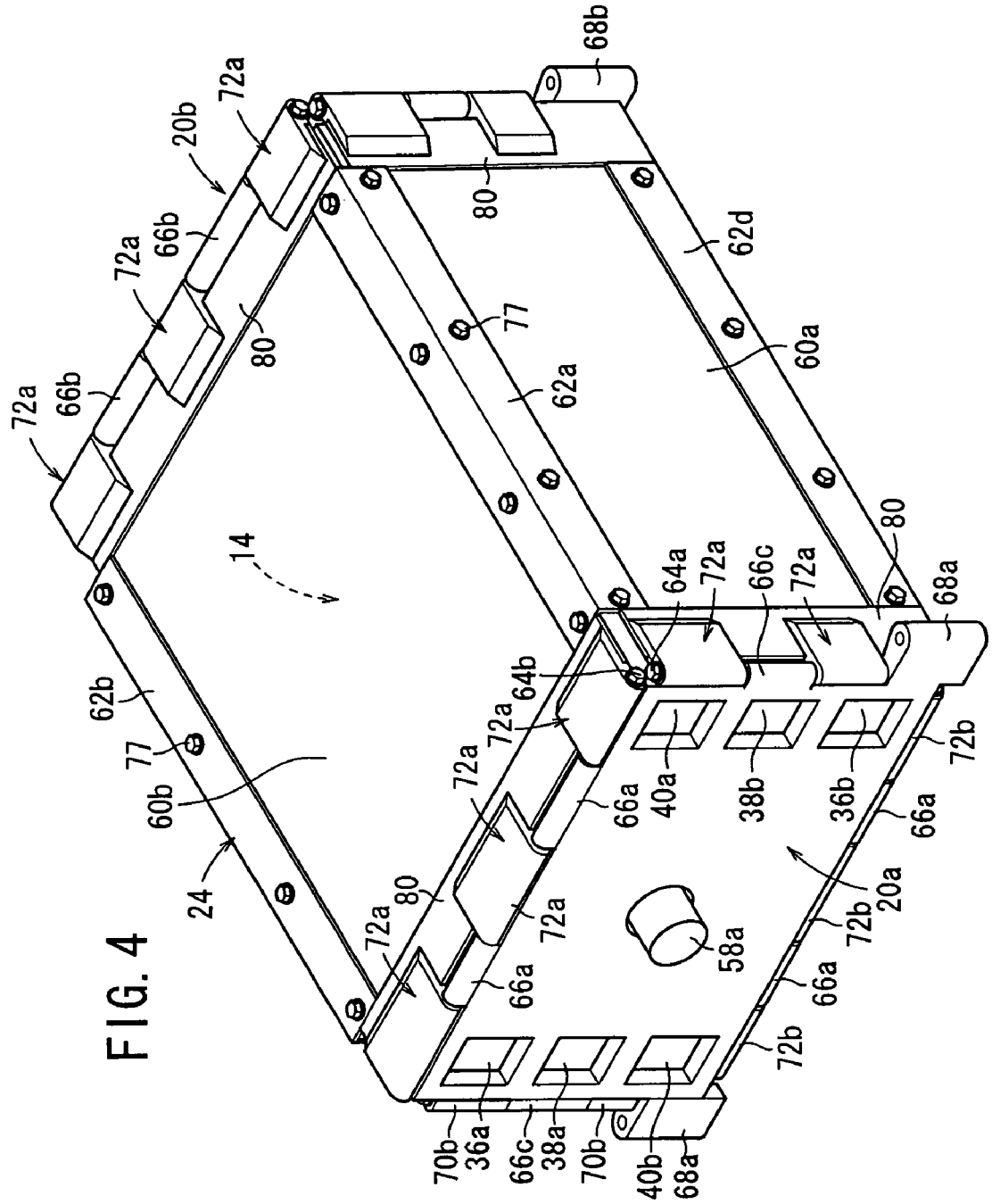
FIG. 4 is a perspective view showing the fuel cell stack.

In the fuel cell stack 10, as shown in FIG. 4, an oxygen-containing gas is supplied to the oxygen-containing gas supply passage 36a from the end plate 20a of the fuel cell stack 10. A fuel gas such as a hydrogen-containing gas is supplied to the fuel gas supply passage 40a. Further, a coolant such as pure water, an ethylene glycol is supplied to the coolant supply passage 38a. Thus, the oxygen-containing gas, the fuel gas, and the coolant are supplied to each of the unit cells 12 stacked together in the direction indicated by the arrow A to form the stack body 14. The oxygen-containing gas, the fuel gas, and the coolant flow in the direction indicated by the arrow A.

As shown in FIG. 3, the oxygen-containing gas flows from the oxygen-containing gas supply passage 36a into the oxygen-containing gas flow field 52 of the second metal separator 34. The oxygen-containing gas flows along the cathode 46 of the membrane electrode assembly 30 for inducing an electrochemical reaction at the cathode 46. The fuel gas flows from the fuel gas supply passage 40a into the fuel gas flow field 48 of the first metal separator 32. The fuel gas flows along the anode 44 of the membrane electrode assembly 30 for inducing an electrochemical reaction at the anode 44.

Thus, in each of the membrane electrode assemblies 30, the oxygen-containing gas supplied to the cathode 46, and the fuel gas supplied to the anode 44 are consumed in the electrochemical reactions at catalyst layers of the cathode 46 and the anode 44 for generating electricity.

After the oxygen in the oxygen-containing gas is consumed at the cathode 46, the oxygen-containing gas flows into the oxygen-containing gas discharge passage 36b, and is discharged to the outside from the end plate 20a. Likewise, after the fuel gas is consumed at the anode 44, the fuel gas flows into the fuel gas discharge passage 40b, and is discharged to the outside from the end plate 20a.

The coolant flows from the coolant supply passage 38a into the coolant flow field 50 between the first and second metal separators 32, 34, and flows in the direction indicated by the arrow B. After the coolant is used for cooling the membrane electrode assembly 30, the coolant flows into the coolant discharge passage 38b, and is discharged to the outside from the end plate 20a.

In the first embodiment, for example, as shown in FIGS. 5 and 6, the mounting plate members 80 are fixed to the opposite ends of the side plate 60b in the longitudinal direction, and the separate second coupling portions 72a are joined respectively to the mounting plate members 80, e.g., by brazing or using adhesive. Thus, in comparison with the structure in which a plurality of the second coupling portions 72a are produced into one piece, the production cost is reduced significantly.

Further, various materials such as metal, non-metal, or resin can be used for forming the second coupling portion 72a. The method of producing the second coupling portion 72a can be selected freely, and cost reduction is achieved effectively. Thus, the second hinge structure 75b which achieves the optimum joining state, e.g., in respect of material, accuracy, and required strength can be obtained. Also in the first hinge structure 75a, the same advantages can be obtained.

Figure 7:
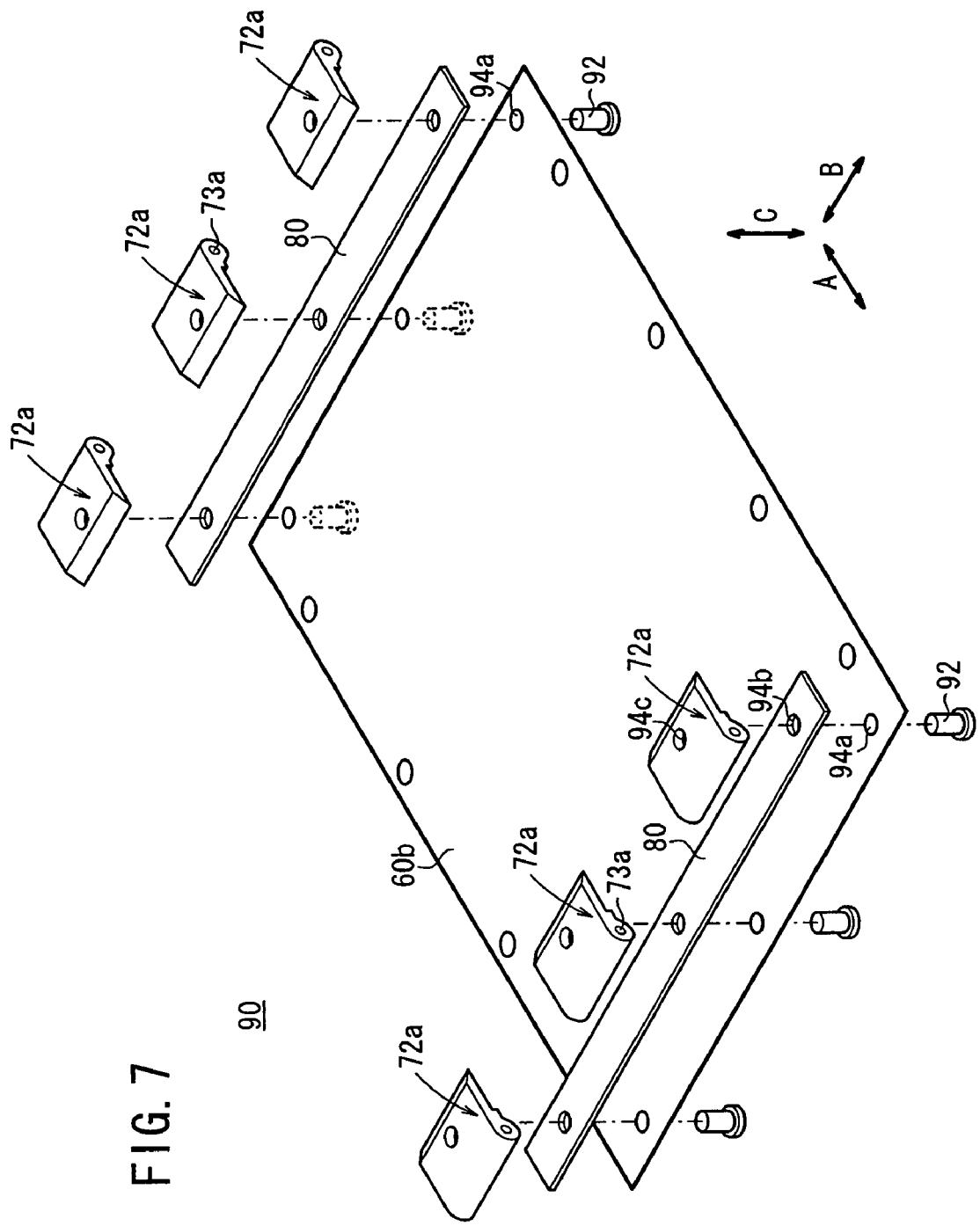
FIG. 7 is an exploded perspective view schematically showing hinge structure of a fuel cell stack according to the second embodiment of the present invention.
Figure 8:
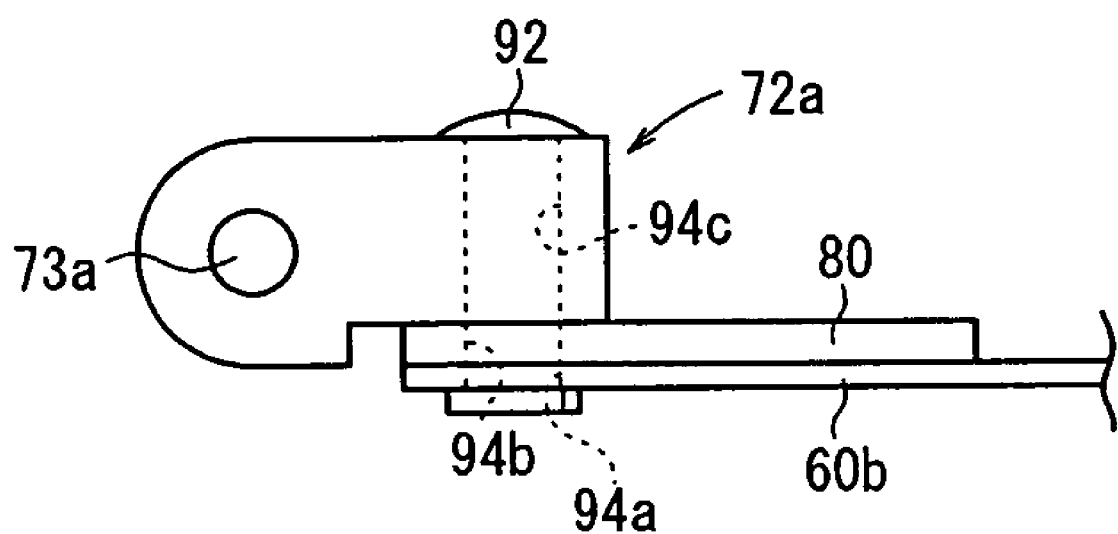
FIG. 8 is a side view schematically showing the hinge structure.

FIG. 7 is an exploded perspective view showing hinge structure 90 of a fuel cell stack 10 according to the second embodiment of the present invention. FIG. 8 is a side view schematically showing the hinge structure 90. The constituent elements that are identical to those of the second hinge structure 75b of the fuel cell stack according to the first embodiment are labeled with the same reference numerals, and description thereof will be omitted. In the second embodiment, structure corresponding to the first hinge structure 75a is not illustrated. However, it is a matter of course that the hinge structure 90 is adopted. Further, also in the third to 32nd embodiments as descried later, the constituent elements that are identical to those of the second hinge structure 75b of the fuel cell stack 10 according to the first embodiment are labeled with the same reference numerals, and description thereof will be omitted.

The hinge structure 90 includes rivets 92. The side plate 60b, the mounting plate member 80, and the second coupling portions 72a have holes 94a to 94c for inserting the rivets 92. As shown in FIG. 8, after the rivets 92 are inserted into the holes 94a to 94c, by crushing ends of the rivets 92, the second coupling portions 72a are joined to the side plates 60b through the mounting plate member 80.

Figure 9:
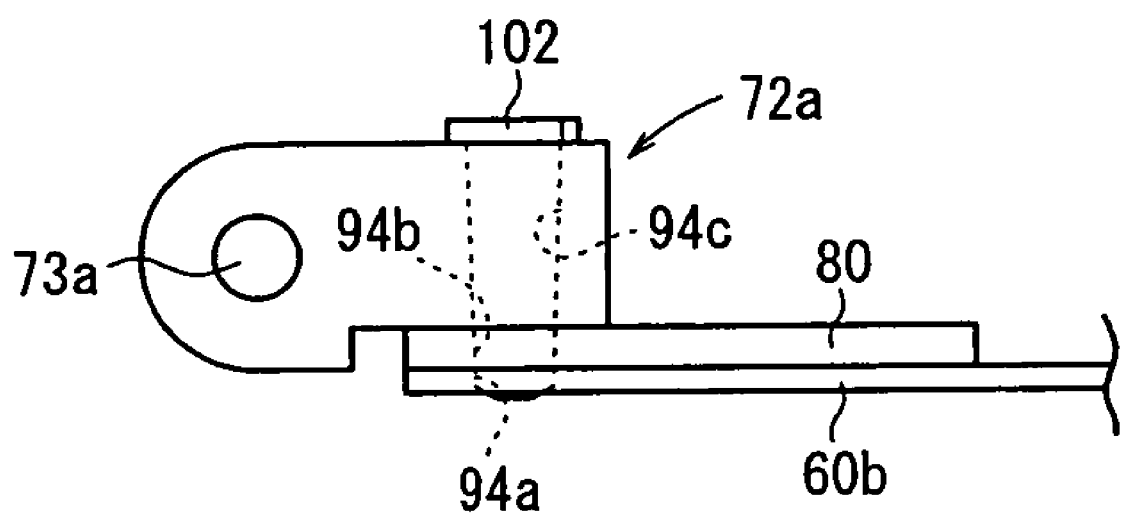
FIG. 9 is a side view schematically showing hinge structure of a fuel cell stack according to the third embodiment of the present invention.

FIG. 9 is a side view schematically showing hinge structure 100 of a fuel cell stack according to the third embodiment of the present invention.

The hinge structure 100 includes a hollow or solid pin 102. The pin 102 is inserted into the holes 94a, 94b, 94c under pressure. Thus, the second coupling portion 72a is joined to the mounting plate member 80.

Figure 10:
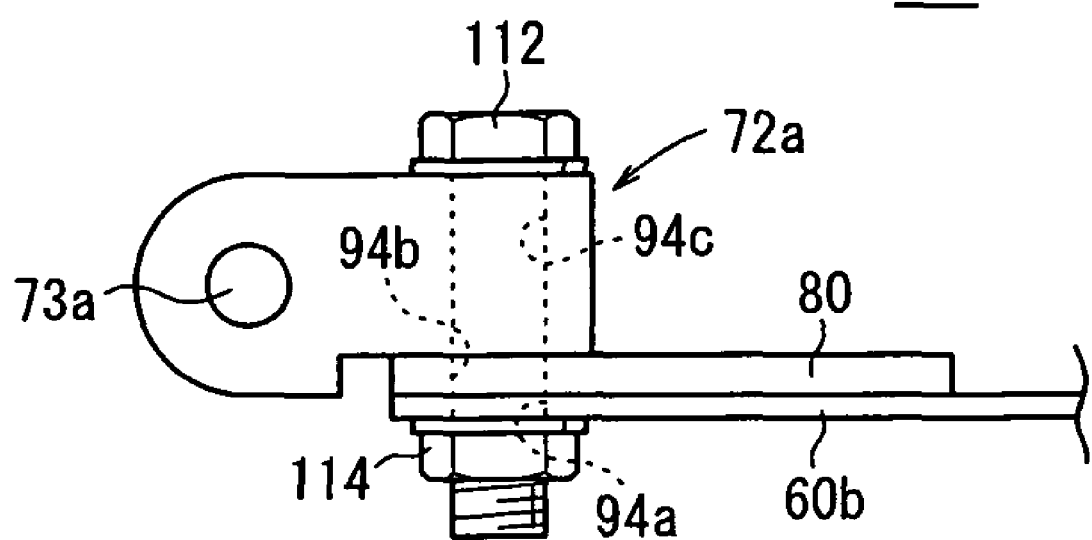
FIG. 10 is a side view schematically showing hinge structure of a fuel cell stack according to the fourth embodiment of the present invention.

FIG. 10 is a side view schematically showing hinge structure 110 of a fuel cell stack according to the fourth embodiment of the present invention.

The hinge structure 110 includes a bolt 112 and a nut 114. The bolt 112 is inserted into the holes 94a, 94b, 94c. A front end of the bolt 112 is screwed into the nut 114. Thus, the second coupling portion 72a is fixed to the side plate 60a.

Figure 11:
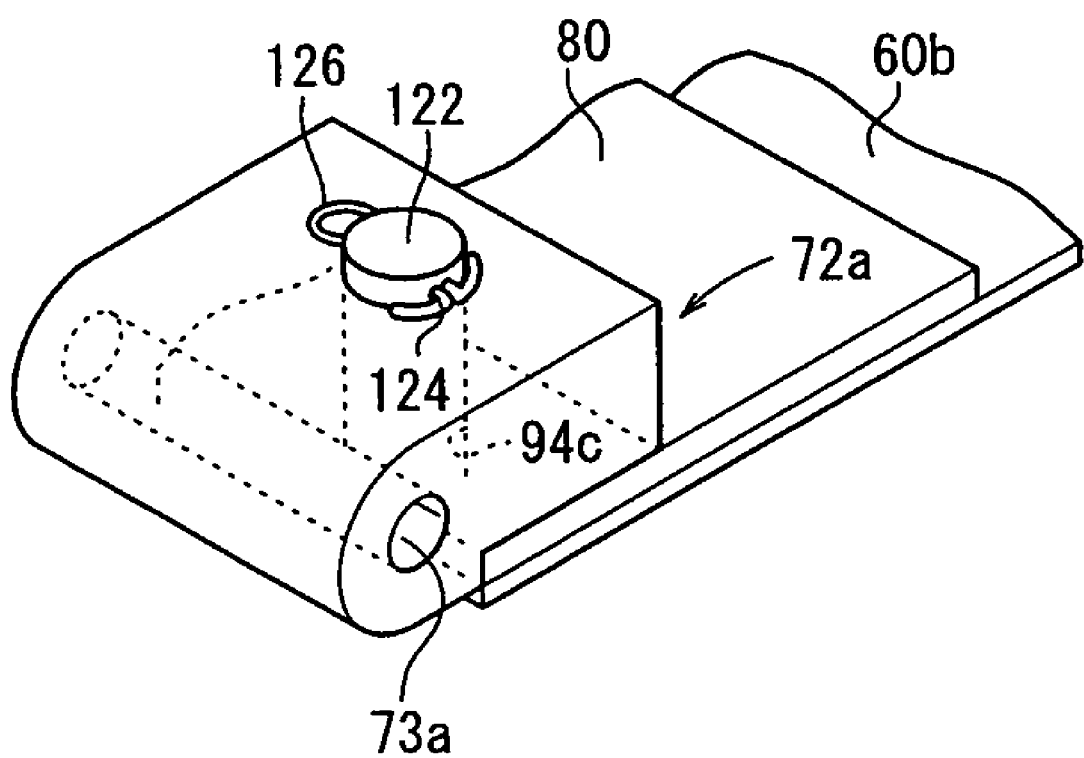
FIG. 11 is a perspective view schematically showing hinge structure of a fuel cell stack according to the fifth embodiment of the present invention.

FIG. 11 is a perspective view schematically showing hinge structure 120 of a fuel cell stack according to the fifth embodiment of the present invention.

The hinge structure 120 includes a mast 122 fixed to the mounting plate member 80. A through hole 124 radially passes through a front end of the mast 122. When the mast 122 is inserted into the hole 94c of the second coupling portion 72a, the hole 124 at the front end of the mast 122 is exposed to the outside. By attaching a split pin 126 into the hole 124, the second coupling portion 72a is joined to the side plate 60b through the mounting plate member 80.

Figure 12:
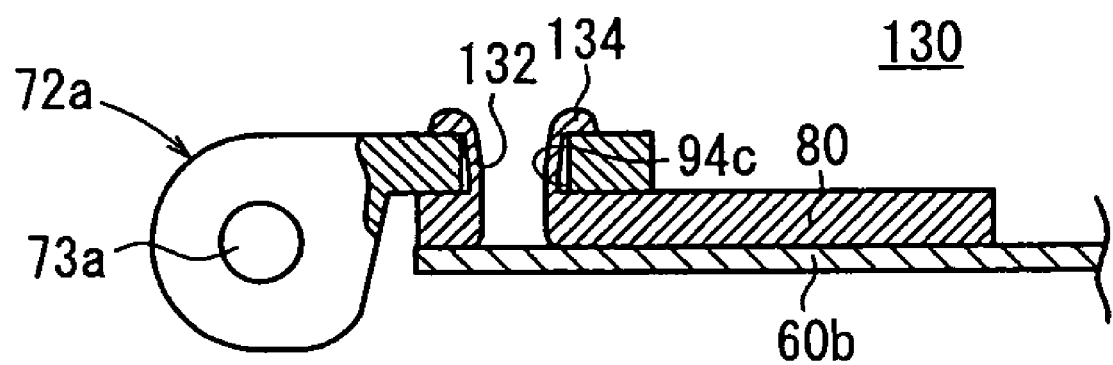
FIG. 12 is a side view schematically showing hinge structure of a fuel cell stack according to the sixth embodiment of the present invention.

FIG. 12 is a partially cross-sectional side view schematically showing hinge structure 130 of a fuel cell stack according to the sixth embodiment of the present invention.

In the hinge structure 130, the mounting plate member 80 undergoes a burring process to have a burring portion 132. After the burring portion 132 is inserted into the hole 94c of the second coupling portion 72a, the burring portion 132 is crimped to form a crimped portion 134.

Figure 13:
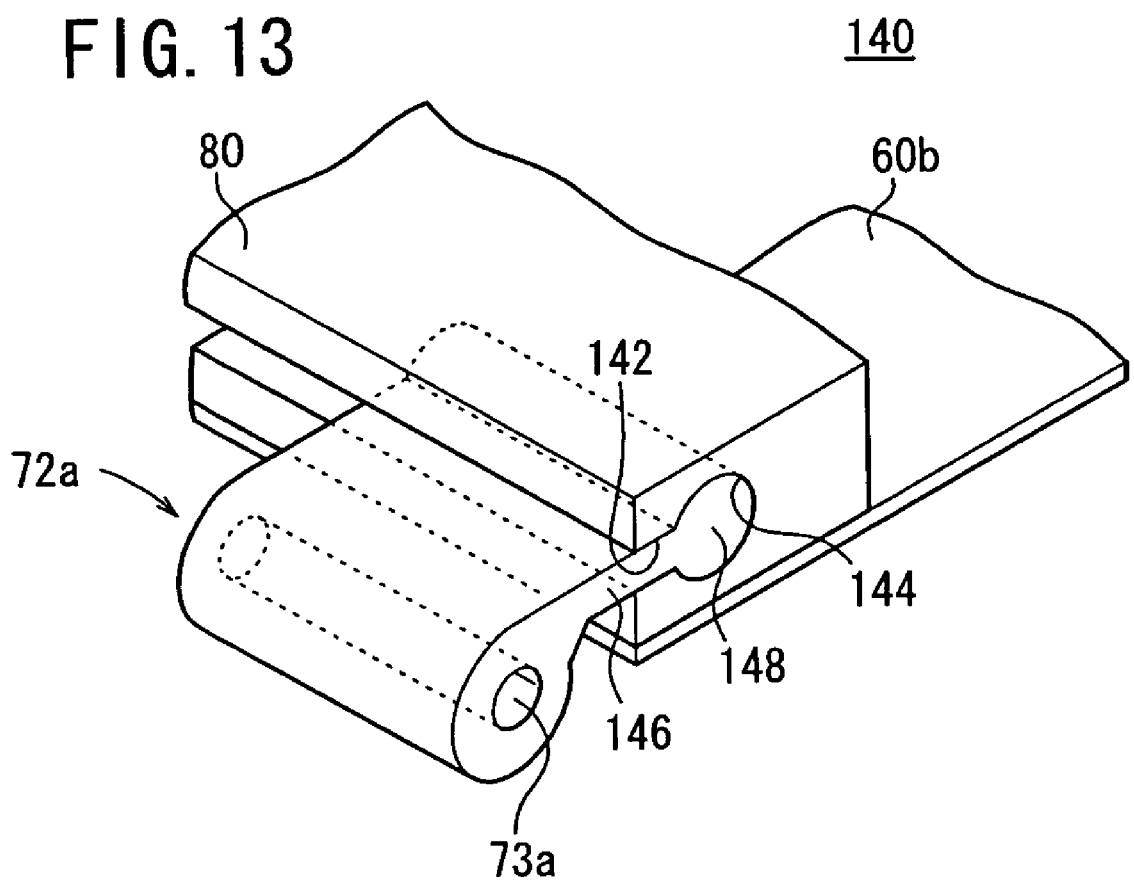
FIG. 13 is a side view schematically showing hinge structure of a fuel cell stack according to the seventh embodiment of the present invention.

FIG. 13 is a perspective view schematically showing hinge structure 140 of a fuel cell stack according to the seventh embodiment of the present invention.

The hinge structure 140 includes a groove 142 and a wide cylindrical groove 144 inside the groove 142. The second coupling portion 72a includes a cylindrical portion 148 and a thin plate portion 146 extending in an axial direction. By sliding the second coupling portion 72a along the mounting plate member 80, the thin plate portion 146 and the cylindrical portion 148 are fitted inside the groove 142 and the cylindrical groove 144. In the structure, the cylindrical portion 148 prevents detachment of the second coupling portion 72a from the mounting plate member 80.

Figure 14:
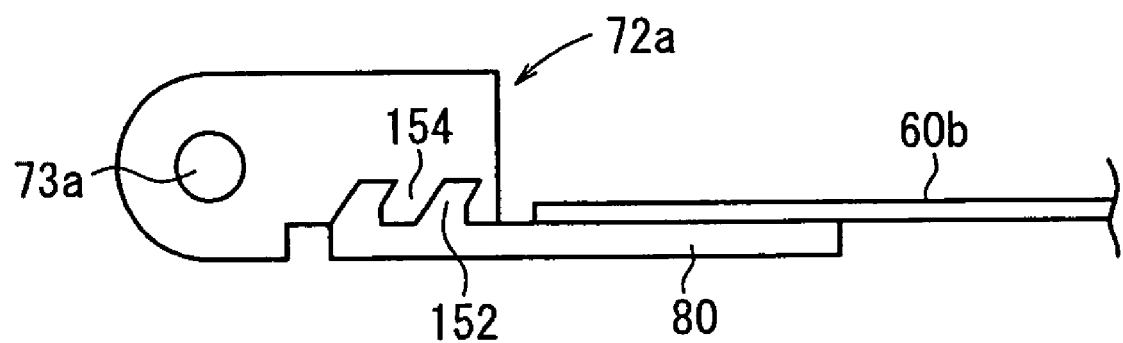
FIG. 14 is a side view schematically showing hinge structure of a fuel cell stack according to the eighth embodiment of the present invention.

FIG. 14 is a side view schematically showing hinge structure 150 of a fuel cell stack according to the eighth embodiment of the present invention.

In the hinge structure 150, the mounting plate member 80 includes a first tooth 152 and the second coupling portion 72a has a second tooth in mesh with the first tooth 152. Thus, by meshing action of the first tooth 152 and the second tooth 154, the second coupling portion 72a is joined to the mounting plate member 80.

Figure 15:
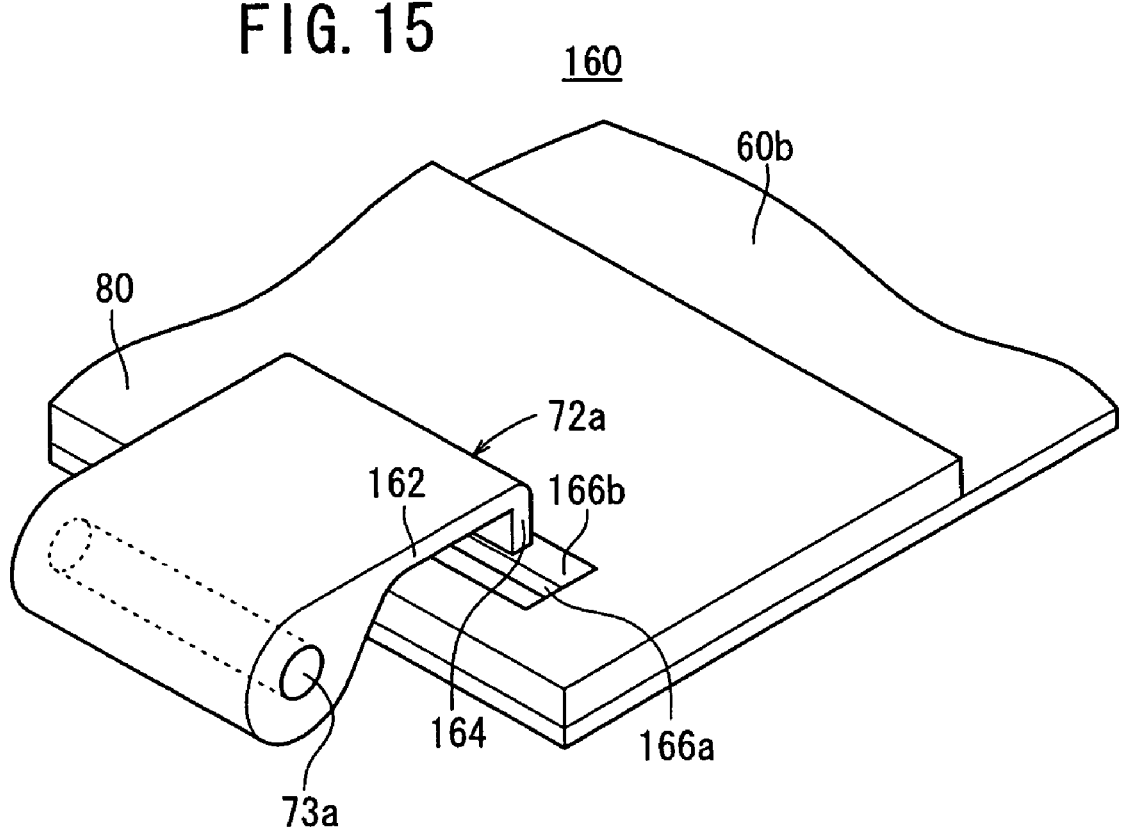
FIG. 15 is an exploded perspective view schematically showing hinge structure of a fuel cell stack according to the ninth embodiment of the present invention.
Figure 16:
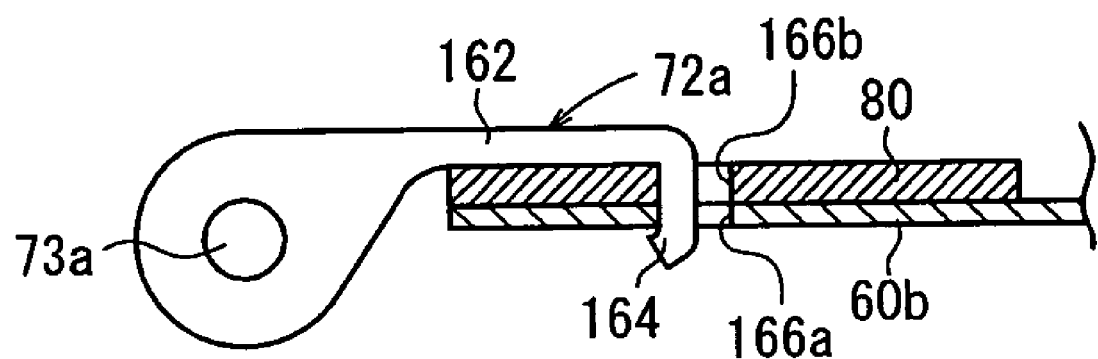
FIG. 16 is a side view schematically showing the hinge structure.

FIG. 15 is a perspective view schematically showing hinge structure 160 of a fuel cell stack according to the ninth embodiment of the present invention. FIG. 16 is a partially cross-sectional side view schematically showing the hinge structure 160.

The second coupling portion 72a of the hinge structure 160 has a relatively thin plate section 162. An end of the plate section 162 has a claw 164 which is bent at an angle of substantially 90°. The side plate 60b and the mounting plate member 80 have openings 166a and 166b for inserting the claw 164. By inserting the claw 164 of the second coupling portion 72a into the openings 166a, 166b, the second coupling portion 72a is supported by the side plate 60b.

Figure 17:
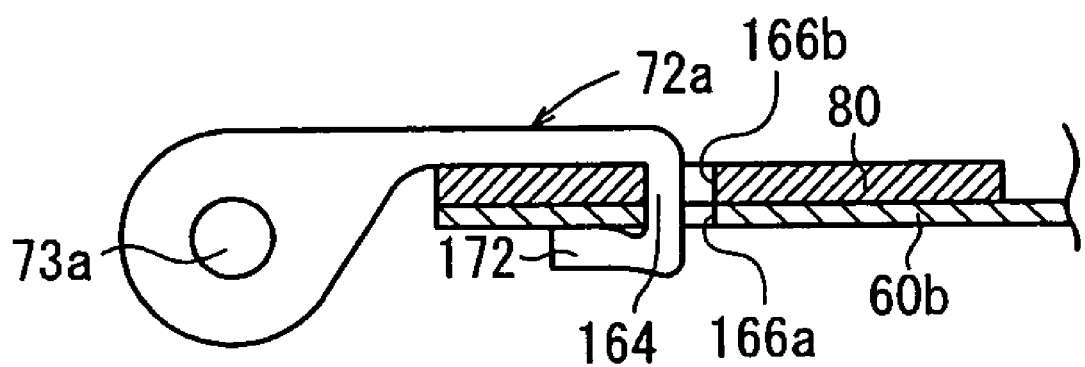
FIG. 17 is a side view schematically showing hinge structure of a fuel cell stack according to the tenth embodiment of the present invention.

FIG. 17 is a partially cross-sectional side view schematically showing hinge structure 170 of a fuel cell stack according to the tenth embodiment of the present invention.

The hinge structure 170 has substantially the same structure as the hinge structure 160. After the claw 164 of the second coupling portion 72a is inserted into the openings 166a, 166b, the claw 164 is crimped to form a crimped portion 172. Thus, the second coupling portion 72a is fixed to the side plate 60b further securely.

Figure 18:
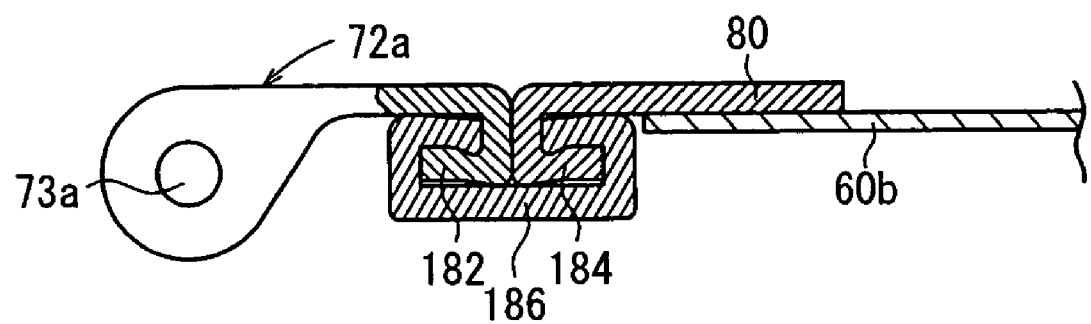
FIG. 18 is a side view schematically showing hinge structure of a fuel cell stack according to the 11th embodiment of the present invention.

FIG. 18 is a partially cross-sectional side view showing hinge structure 180 of a fuel cell stack according to the 11th embodiment of the present invention.

In the hinge structure 180, a bent portion 182 which is bent in a substantially U-shape is formed at an end of the second coupling portion 72a. Further, a bent portion 184 which is bent in a substantially U-shape is formed at an end of the mounting plate member 80. The bending direction of the bent portion 182 and the bending direction of the bent portion 184 are opposite to each other. In a state where the bent portion 182 and the bent portion 184 are abutted against each other, i.e., in a state where the bent portion 182 and the bent portion 184 protrude away from each other, a fixing member 186 is attached to the bent portion 182 and the bent portion 184. The fixing member 186 can reliably hold the bent portions 182, 184 together. Thus, the second coupling portion 72a is fixed to the mounting plate member 80.

Figure 19:
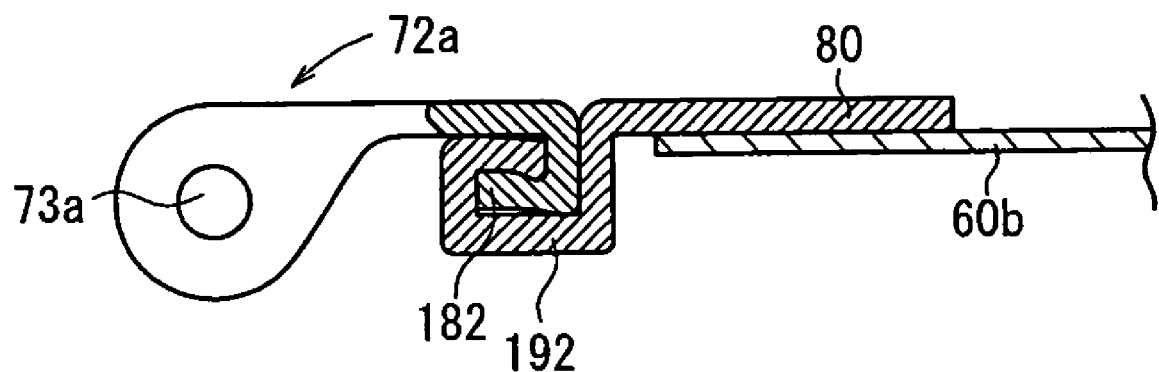
FIG. 19 is a side view schematically showing hinge structure of a fuel cell stack according to the 12th embodiment of the present invention.

FIG. 19 is a partially cross-sectional side view schematically showing hinge structure of a fuel cell stack according to the 12th embodiment of the present invention.

In the hinge structure 190, the bent portion 182 is formed in the second coupling portion 72a, and a crimped portion 192 is formed around the bent portion 182 at an end of the mounting plate member 80.

Figure 20:
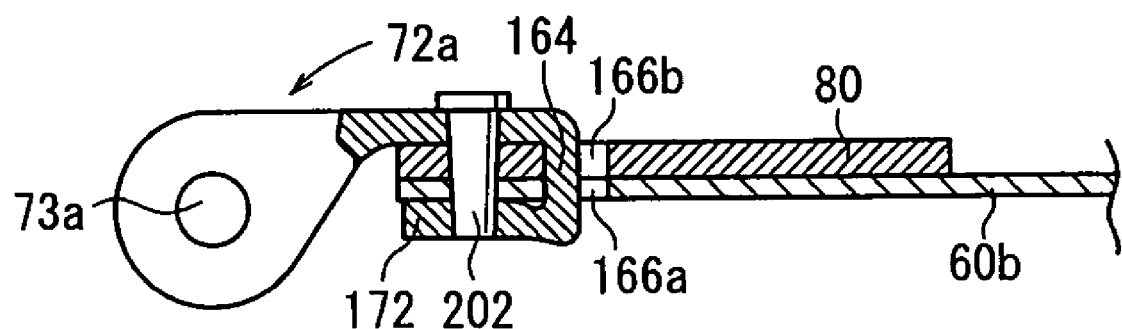
FIG. 20 is a side view schematically showing hinge structure of a fuel cell stack according to the 13th embodiment of the present invention.

FIG. 20 is a side view schematically showing hinge structure 200 of a fuel cell stack according to the 13th embodiment of the present invention.

The hinge structure 200 has the same structure as the hinge structure 170. Further, a pin 202 is inserted into the mounting plate member 80 and the side plate 60b under pressure.

Figure 21:
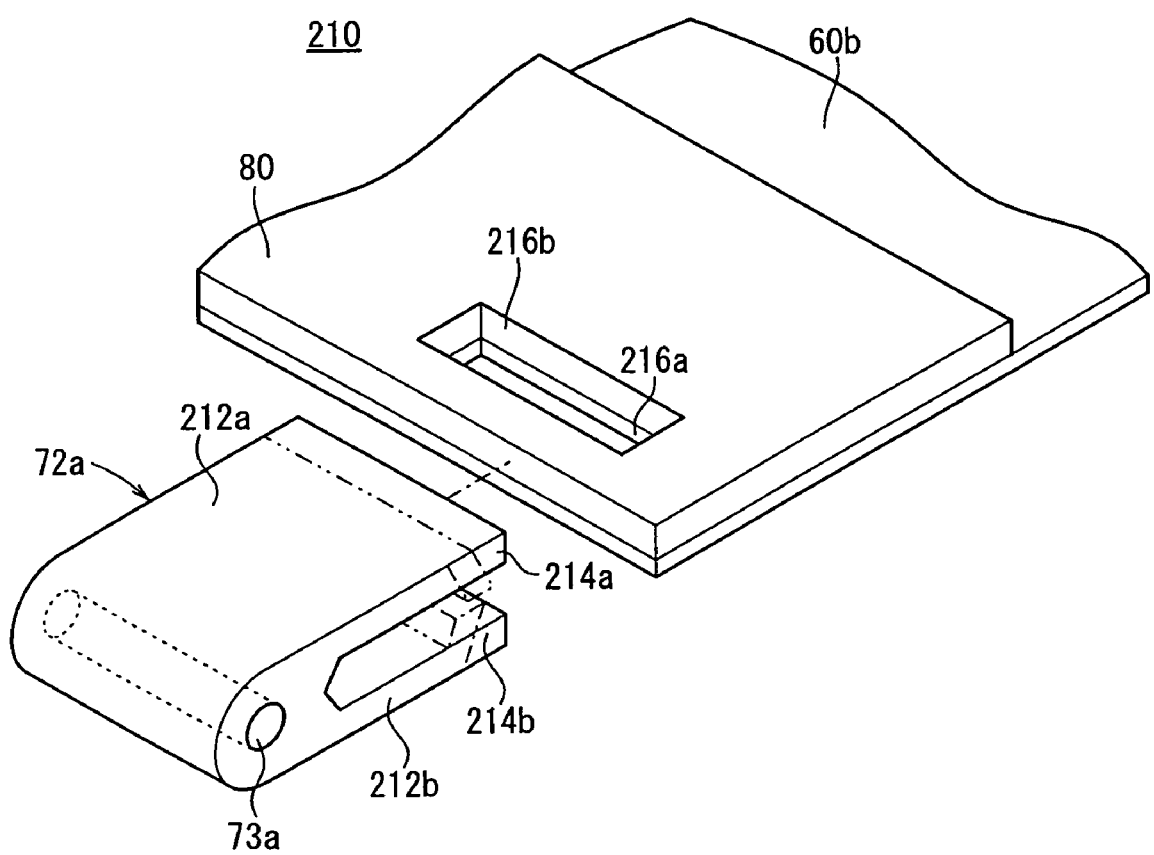
FIG. 21 is an exploded perspective view schematically showing hinge structure of a fuel cell stack according to the 14th embodiment of the present invention.
Figure 22:
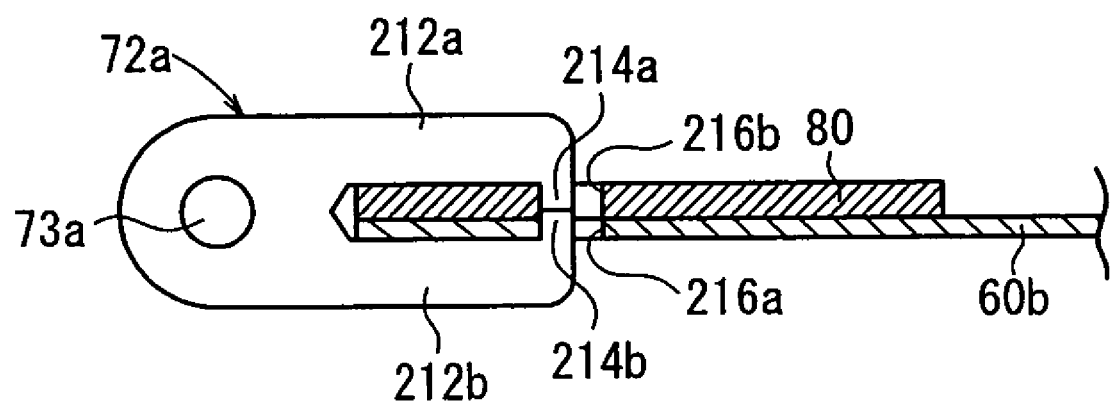
FIG. 22 is a side view schematically showing the hinge structure.

FIG. 21 is an exploded perspective view showing hinge structure 210 of a fuel cell stack according to the 14th embodiment of the present invention. FIG. 22 is a partially cross-sectional side view schematically showing the hinge structure 210.

The second coupling portion 72a of the hinge structure 210 has parallel plate sections 212a, 212b. Crimped portions 214a, 214b are formed at front end portions of the plate sections 212a, 212b. The side plate 60b and the mounting plate member 80 have openings 216a, 216b, and the crimped portions 214a, 214b are inserted into the openings 216a, 216b of the side plate 60b and the mounting plate member 80 under pressure.

As shown in FIG. 22 in a state where the side plate 60b and the mounting plate member 80 are inserted between the plate sections 212a, 212b of the second coupling portion 72a, ends of the plate sections 212a, 212b are crimped to form the crimped portions 214a, 214b. Thus, the crimped portions 214a, 214b are pushed into the openings 216a, 216b, and the second coupling portion 72a is joined to the side plate 60b and the mounting plate member 80.

Figure 23:
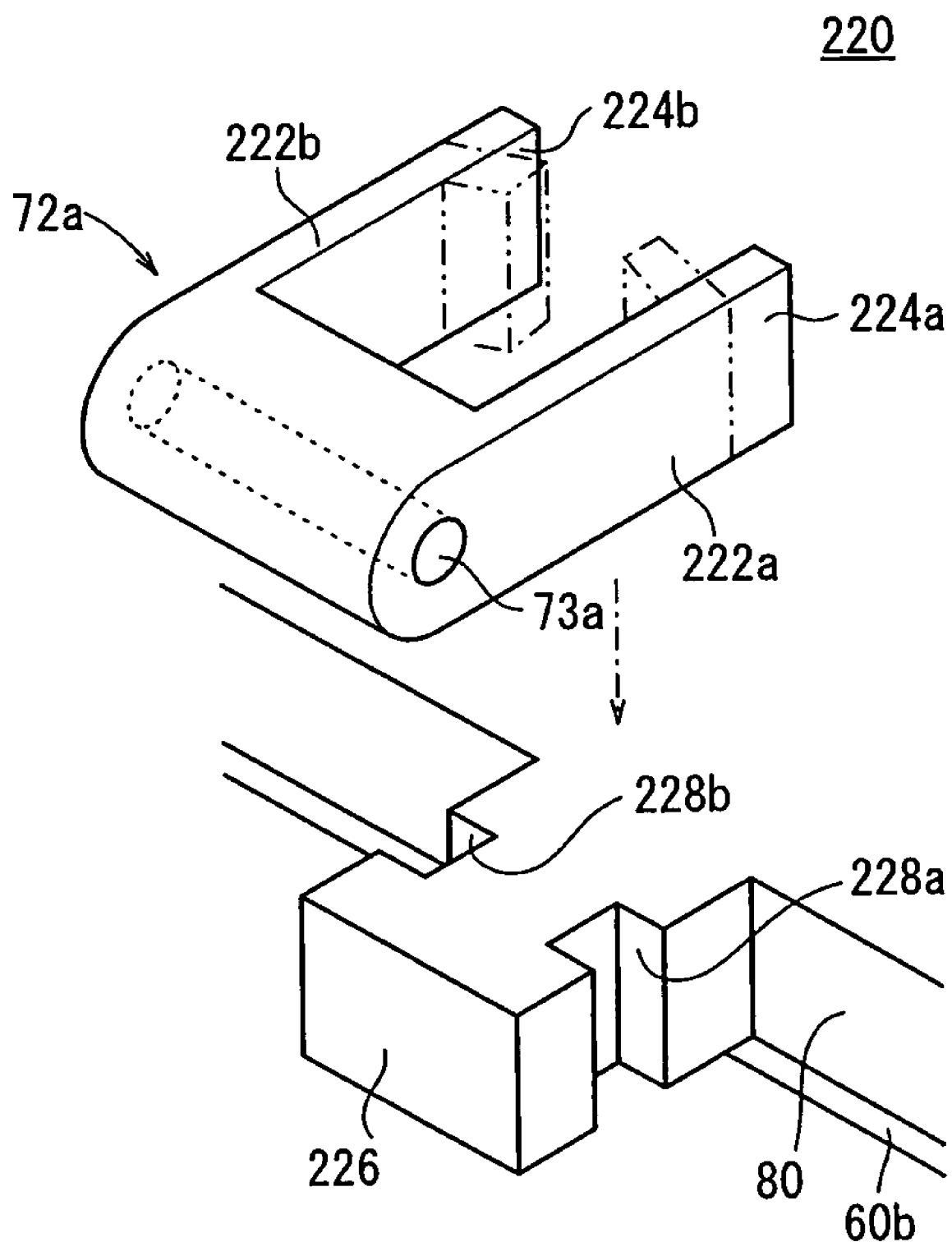
FIG. 23 is an exploded perspective view schematically showing hinge structure of a fuel cell stack according to the 15th embodiment of the present invention.
Figure 24:
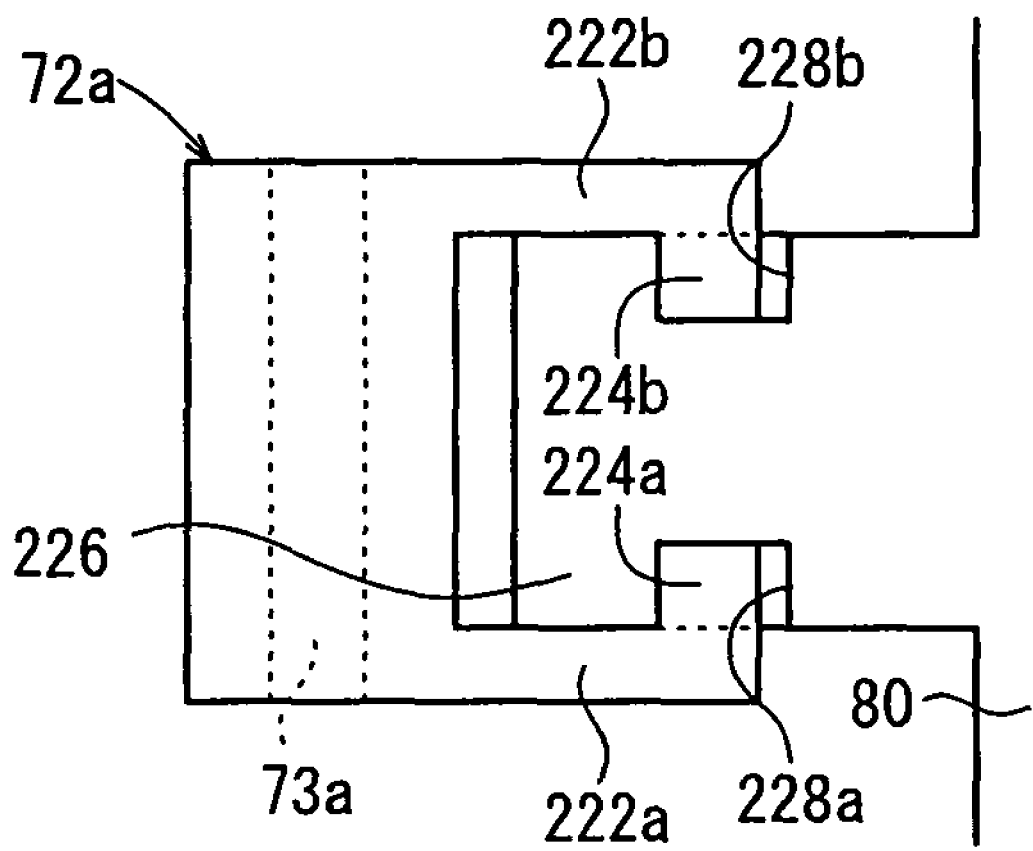
FIG. 24 is a side view schematically showing the hinge structure.

FIG. 23 is an exploded perspective view schematically showing hinge structure 220 of a fuel cell stack according to the 15th embodiment of the present invention. FIG. 24 is a side view schematically showing the hinge structure 220.

In the hinge structure 220, the plate sections 222a, 222b are provided in parallel with each other at opposite ends in an axial direction of the second coupling portions 72a, and the crimped portions 224a, 224b are provided at ends of the plate sections 222a, 222b. An expansion 226 protruding outwardly is provided at an end of the mounting plate member 80. The expansion 226 has grooves 228a, 228b.

The expansion 226 is inserted between the plate sections 222a, 222b of the second coupling portion 72a. In this state, the ends of the plate sections 222a, 222b are crimped to form the crimped portions 224a, 224b. The crimped portions 224a, 224b are inserted into the grooves 228a, 228b under pressure. Thus, the second coupling portion 72a is joined to the mounting plate member 80 securely.

Figure 25:
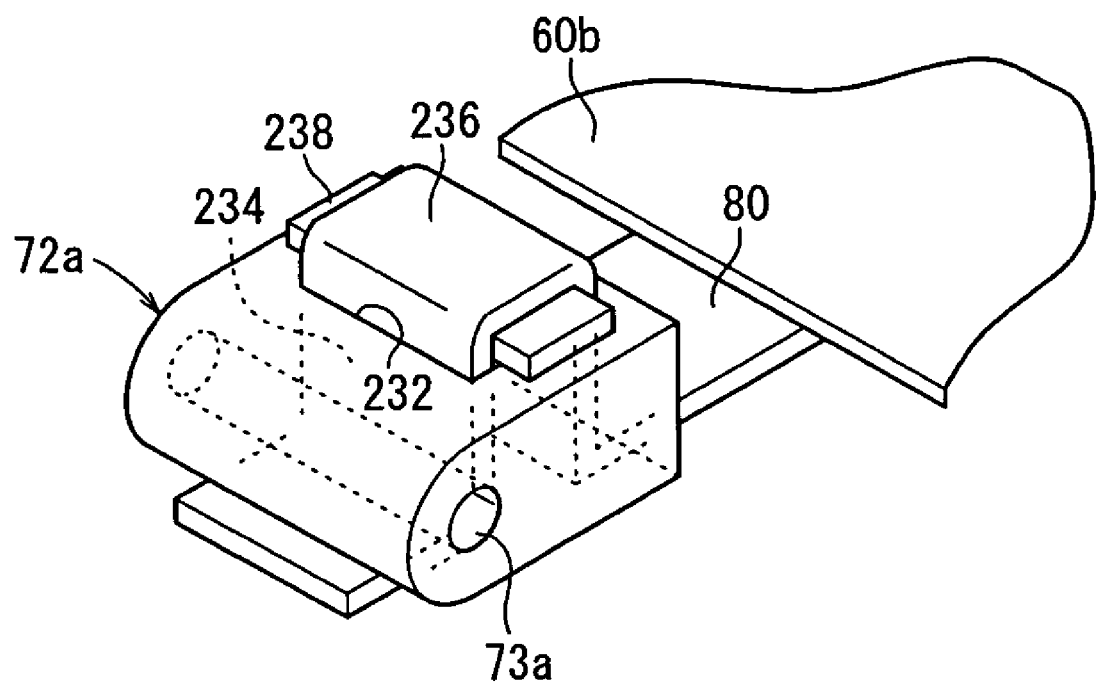
FIG. 25 is a perspective view schematically showing hinge structure of a fuel cell stack according to the 16th embodiment of the present invention.
Figure 26:
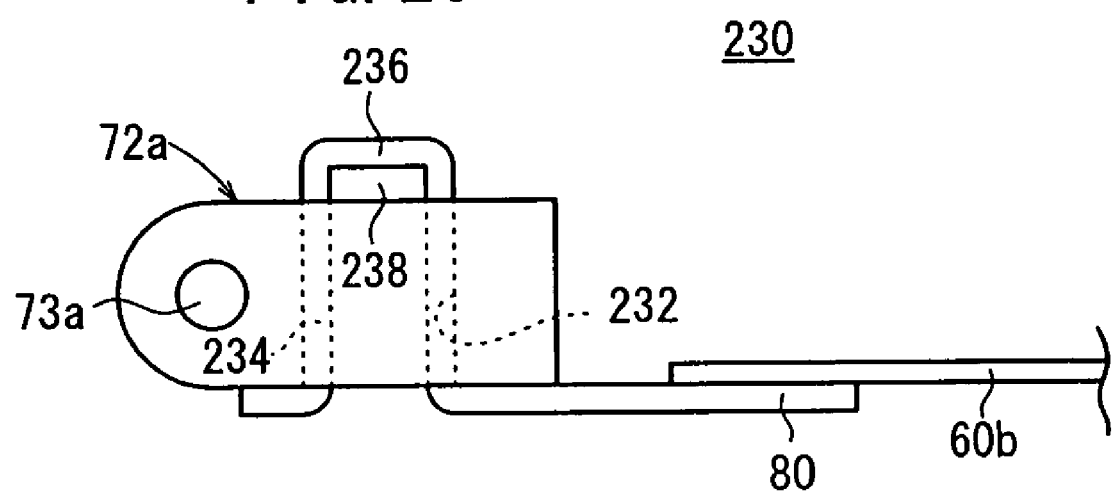
FIG. 26 is a side view schematically showing the hinge structure.

FIG. 25 is a perspective view schematically showing hinge structure 230 of a fuel cell stack according to the 16th embodiment of the present invention. FIG. 26 is a side view schematically showing the hinge structure 230.

In the hinge structure 230, the second coupling portion 72a has a rectangular opening 232. The mounting plate member 80 includes a bent portion 234 inserted into the opening 232. The bent portion 234 of the mounting plate member 80 is inserted into the opening 232 of the second coupling portion 72a, and a rectangular stopper plate 238 is inserted between a wall protruding to the outside from the opening 232 and the second coupling portion 72a under pressure. Thus, the second coupling portion 72a is joined to the side plate 60b through the mounting plate member 80.

Figure 27:
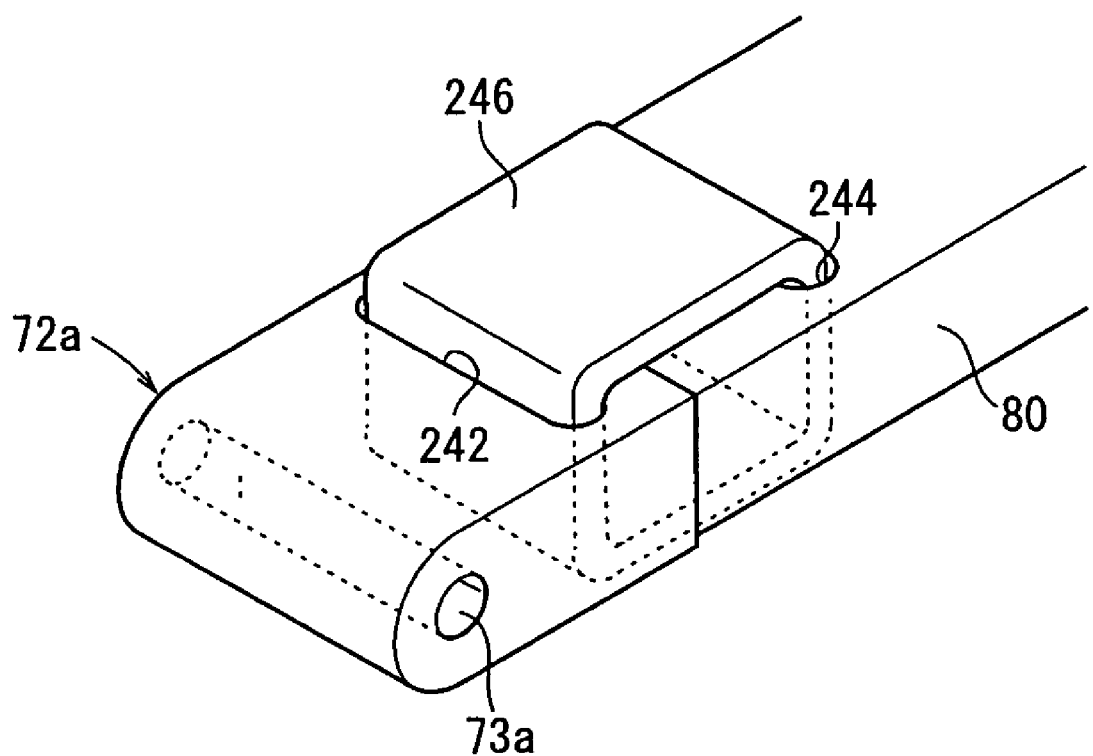
FIG. 27 is a perspective view schematically showing hinge structure of a fuel cell stack according to the 17th embodiment of the present invention.

FIG. 27 is a perspective view schematically showing hinge structure 240 of a fuel cell stack according to the 17th embodiment of the present invention.

In the hinge structure 240, the second coupling portion 72a has an opening 242, and likewise, the mounting plate member 80 has an opening 244. A ring shaped belt member 246 is provided in the openings 242, 244. Thus, the second coupling portion 72a is tiltably supported by the mounting plate member 80. For example, the belt member 246 is made of resin, fabric, or rubber.

Figure 28:
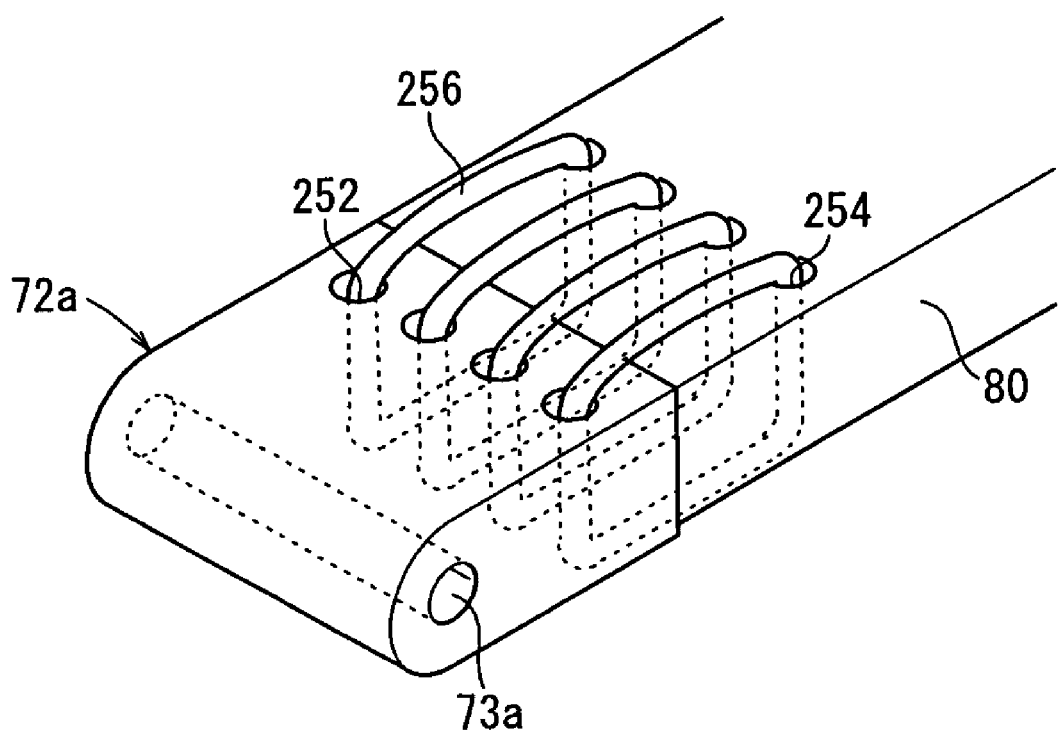
FIG. 28 is a perspective view schematically showing hinge structure of a fuel cell stack according to the 18th embodiment of the present invention.

FIG. 28 is a perspective view schematically showing hinge structure 250 of a fuel cell stack according to an 18th embodiment of the present invention.

In the hinge structure 250, the second coupling portions 72a has a plurality of holes 252, and likewise, the mounting plate member 80 has a plurality of holes 254. Ring shaped wire members 256 are inserted into the holes 252, 254, respectively. Thus, the second coupling portion 72a is tiltably attached to the mounting plate member 80.

Figure 29:
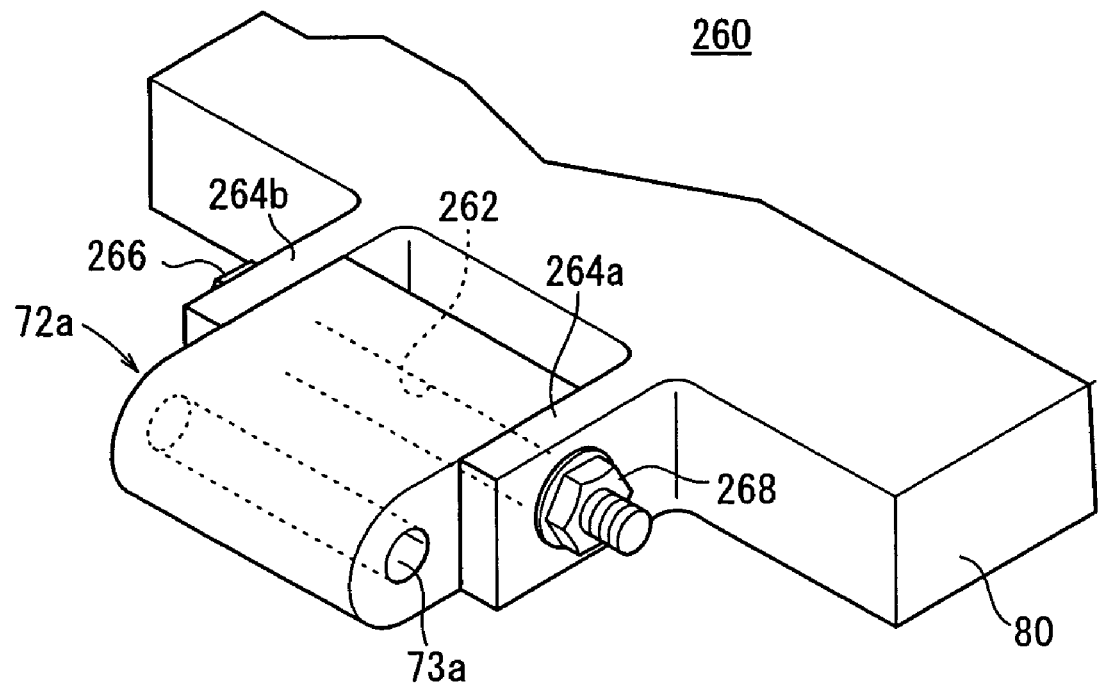
FIG. 29 is a perspective view schematically showing hinge structure of a fuel cell stack according to the 19th embodiment of the present invention.

FIG. 29 is a perspective view schematically showing hinge structure 260 according to the 19th embodiment of the present invention.

In the hinge structure 260, the second coupling portion 72a has a hole 73a and a bolt insertion hole 262 in parallel with the hole 73a. A pair of ribs 264a, 264b protrude from the mounting plate member 80, at positions spaced from each other, corresponding to the width (dimension in the axial direction) of the second coupling portion 72a. The second coupling portion 72a is provided between the ribs 264a, 264b. A bolt 266 is inserted into the ribs 264a, 264b, and the hole 262, and a front end of the bolt 266 is threadably fitted into a nut 268. Thus, the second coupling portion 72a is tiltably supported by the mounting plate member 80.

Figure 30:
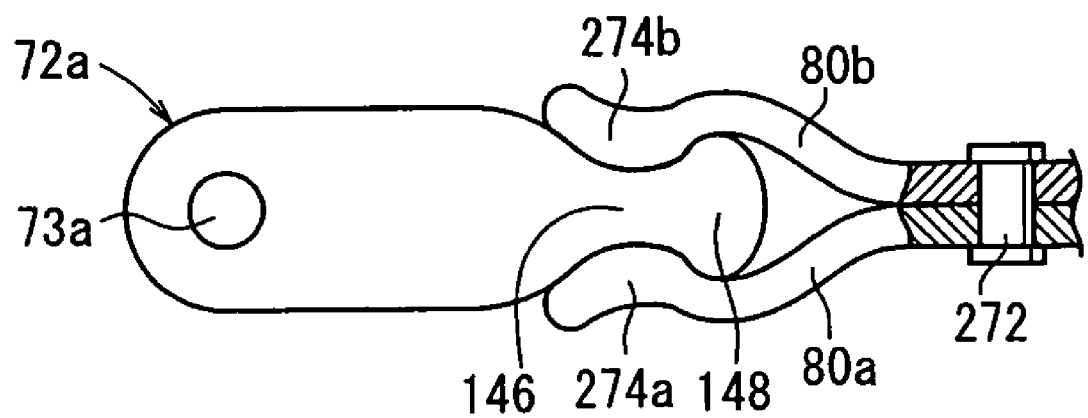
FIG. 30 is a side view schematically showing hinge structure of a fuel cell stack according to the 20th embodiment of the present invention.

FIG. 30 is a side view schematically showing hinge structure 270 of a fuel cell stack according to the 20th embodiment of the present invention.

The second coupling portion 72a of the hinge structure 270 includes a thin plate section 146 and a cylindrical portion 148 like the hinge structure 140. A pair of the mounting plate members 80a, 80b are coupled together through a rivet (or a pressure insertion pin or the like) 272. Outer ends of the mounting plate members 80a, 80b are crimped to form crimped portions 274a, 274b.

Figure 31:
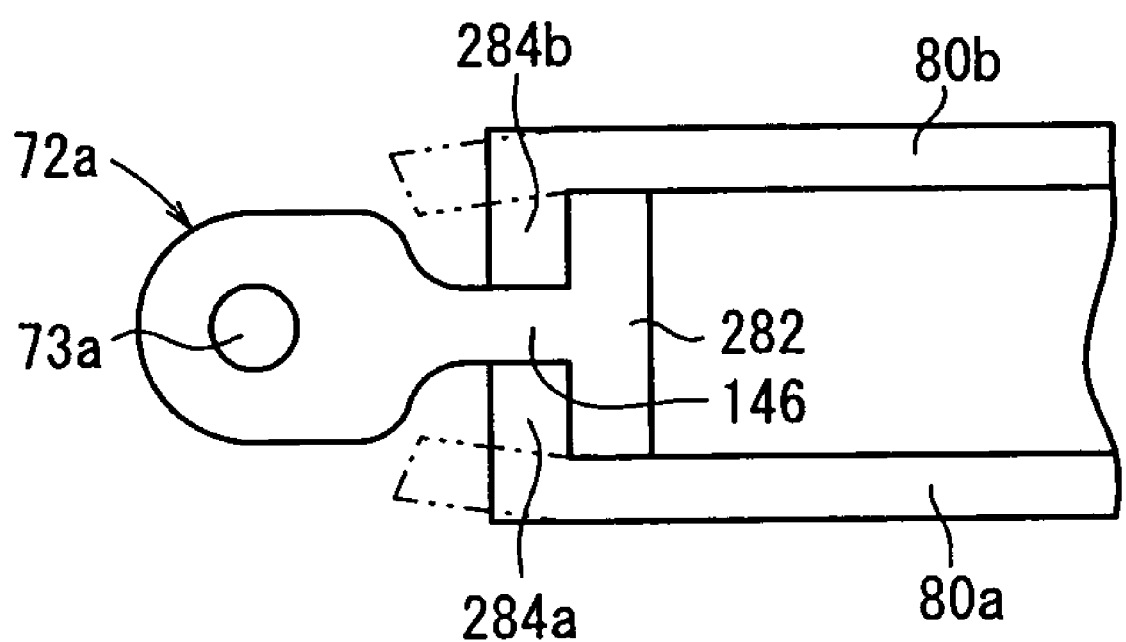
FIG. 31 is a side view schematically showing hinge structure of a fuel cell stack according to the 21st embodiment of the present invention.

FIG. 31 is a side view schematically showing hinge structure 280 of a fuel cell stack according to the 21st embodiment of the present invention.

The second coupling portion 72a of the hinge structure 280 has a wide portion 282 at an end of the thin plate section 146. Front ends of a pair of the mounting plate members 80a, 80b are crimped to form crimped portions 284a, 284b that are bent inwardly. Thus, the crimped portions 284a, 284b bent toward the thin plate section 146 of the second coupling portion 72a, and the wide portion 282 is fixed such that detachment of the widen portion 282 does not occur.

Figure 32:
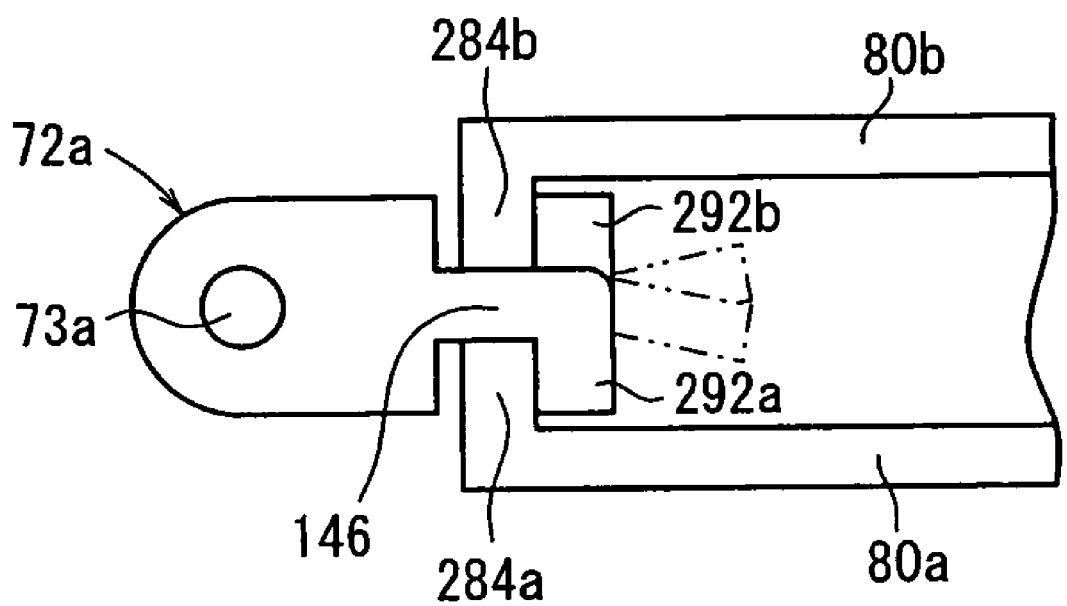
FIG. 32 is a side view schematically showing hinge structure of a fuel cell stack according to the 22nd embodiment of the present invention.

FIG. 32 is a side view schematically showing hinge structure 290 of a fuel cell stack according to the 22nd embodiment of the present invention.

In the hinge structure 290, torn sections 292a, 292b are provided in the thin plate 146 of the second coupling portion 72a through cutouts (not shown). Front ends of the pair of mounting plate members 80a, 80b are bent beforehand. After the thin plate section 146 is inserted into a narrow space between the front ends of the mounting plate members 80a, 80b, the torn sections 292a, 292b are crimped in opposite directions. Thus, the second coupling portion 72a is joined to the mounting plate members 80a, 80b.

Figure 33:
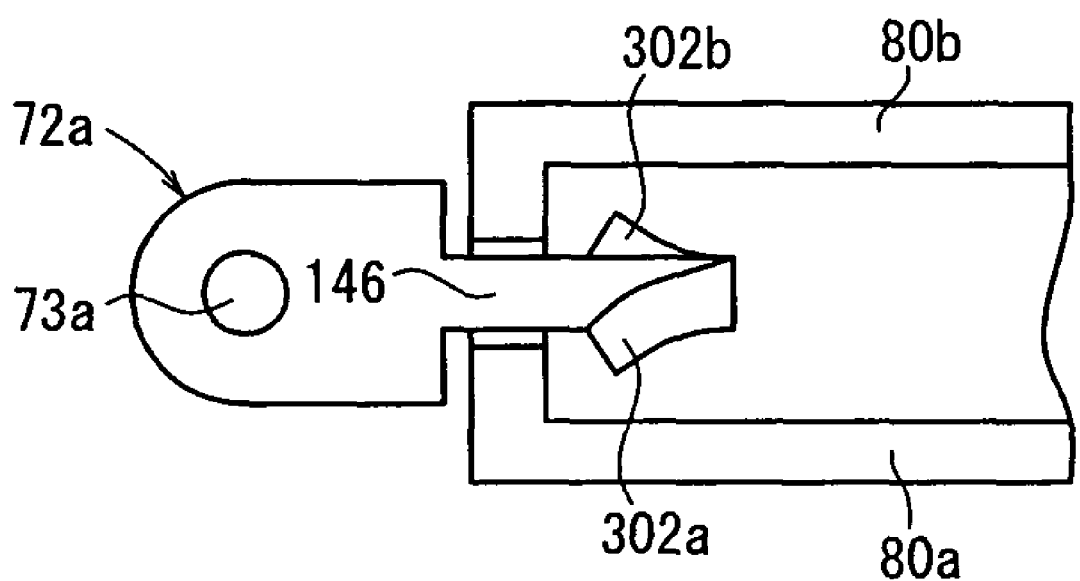
FIG. 33 is a side view schematically showing hinge structure of a fuel cell stack according to the 23rd embodiment of the present invention.

FIG. 33 is a side view schematically showing hinge structure 300 of a fuel cell stack according to 23rd embodiment of the present invention.

In the hinge structure 300, torn sections 302a, 302b curved in different directions from each other toward the hole 73a are provided near a front end of the thin plate section 146 of the second coupling portion 72a. The second coupling portion 72a is pushed into a narrow space between the pair of mounting plate members 80a, 80b. In the structure, after the torn sections 302a, 302b are deformed close to the thin plate section 146, the torn sections 302a, 302b are deformed in different directions from each other again. Thus, the second coupling portion 72a is securely fixed to the mounting plate members 80a, 80b such that detachment of the second coupling portion 72a does not occur.

Figure 34:
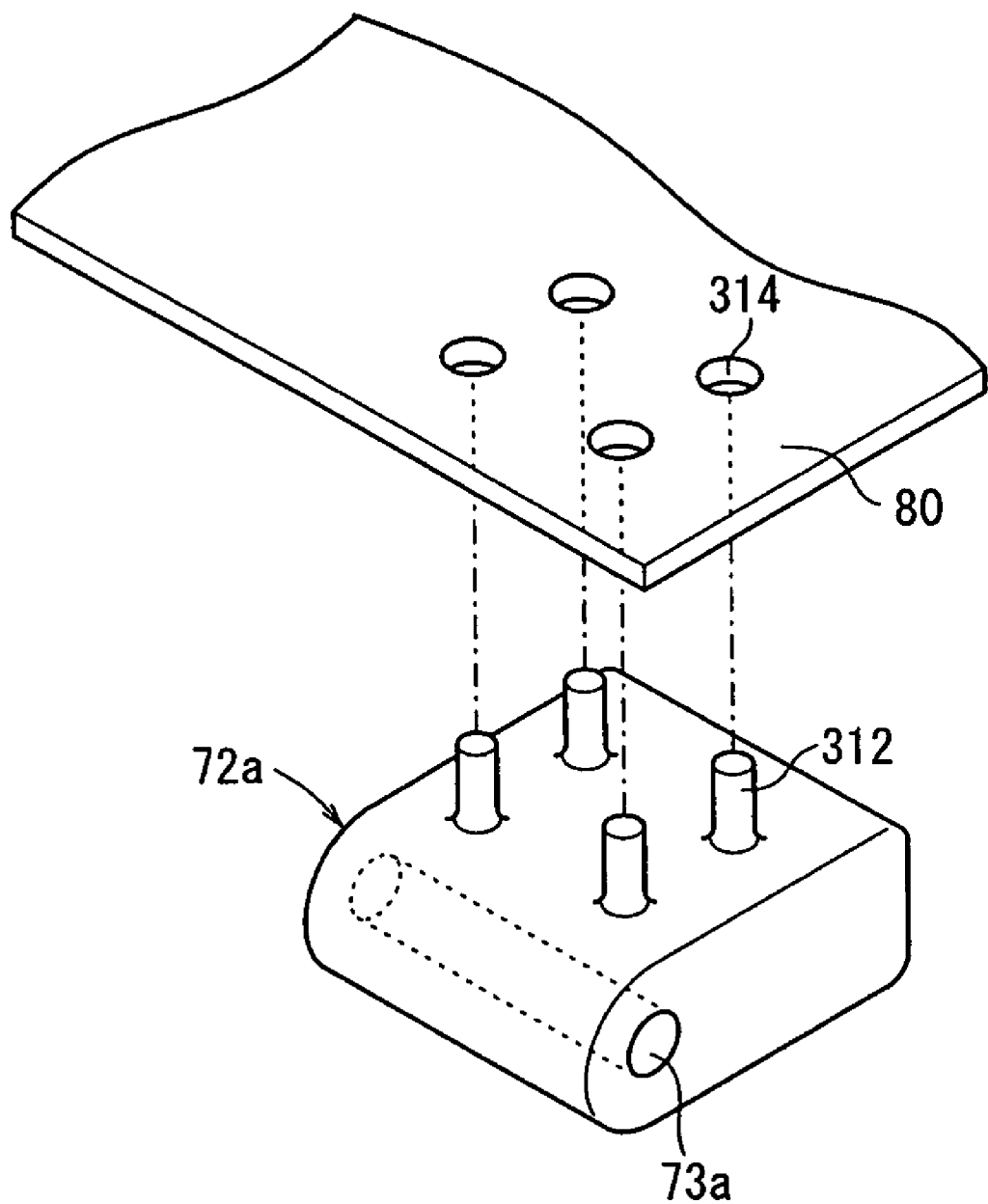
FIG. 34 is a perspective view schematically showing hinge structure of a fuel cell stack according to the 24th embodiment of the present invention.

FIG. 34 is a perspective view schematically showing hinge structure 310 of a fuel cell stack according to the 24th embodiment of the present invention.

In the hinge structure 310, a plurality of projections 312 are formed in the second coupling portion 72a, and a plurality of holes 314 are formed in the mounting plate member 80, corresponding to the projections 312. After the projections 312 of the second coupling portion 72a are inserted into the holes 314 of the mounting plate member 80, the projections 312 are crimped to join the second coupling portion 72a to the mounting plate member 80.

Figure 35:
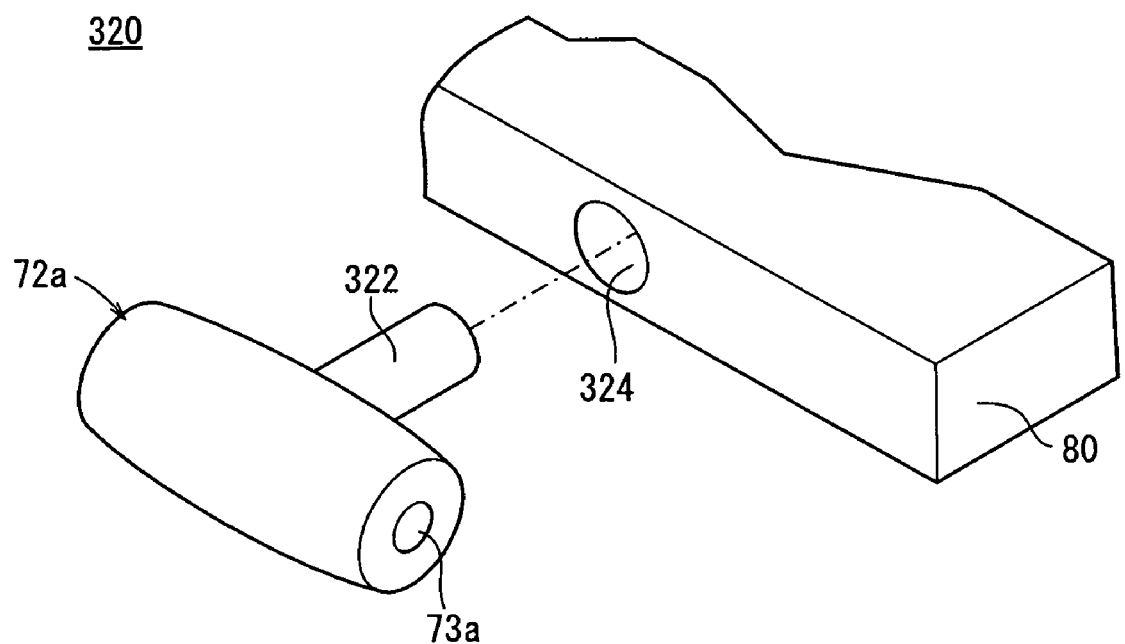
FIG. 35 is a perspective view schematically showing hinge structure of a fuel cell stack according to the 25th embodiment of the present invention.

FIG. 35 is an exploded perspective view schematically showing hinge structure 320 of a fuel cell stack according to the 25th embodiment of the present invention.

In the hinge structure 320, a rod 322 protrudes from substantially the center of the second coupling portion 72a in the axial direction. The mounting plate member 80 has a hole 324 corresponding to the rod 322. The rod 322 is inserted into the hole 324 under pressure, and fixed by adhesion, welding, pin coupling or the like. Thus, the second coupling portion 72a is joined to the mounting plate member 80.

Figure 36:
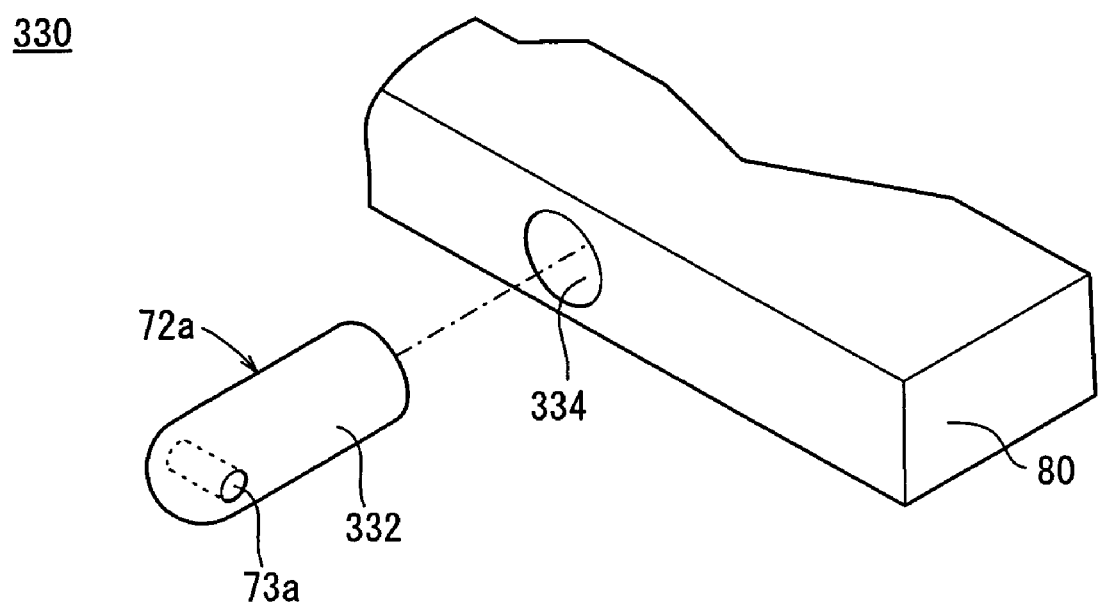
FIG. 36 is an exploded perspective view schematically showing hinge structure of a fuel cell stack according to the 26th embodiment of the present invention.

FIG. 36 is an exploded perspective view schematically showing hinge structure 330 of a fuel cell stack according to the 26th embodiment of the present invention.

The second coupling portion 72a of the hinge structure 330 has a pin shape as a whole. The second coupling portion 72a has a hole 73a on one side, and a cylindrical portion 332 on the other side. The mounting plate member 80 has a hole 334 corresponding to the cylindrical portion 332, and the cylindrical portion 332 is joined to hole 334 by insertion under pressure or crimping.

Figure 37:
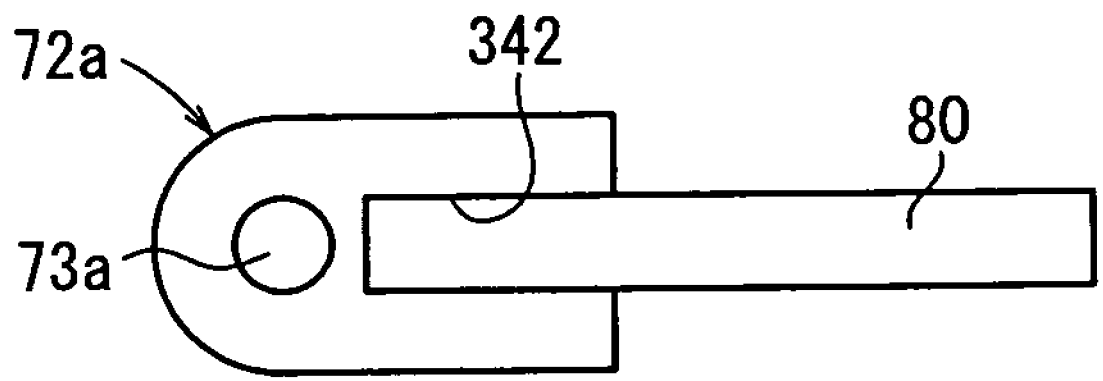
FIG. 37 is a side view schematically showing hinge structure of a fuel cell stack according to the 27th embodiment of the present invention.

FIG. 37 is a side view schematically showing hinge structure 340 of a fuel cell stack according to the 27th embodiment of the present invention.

In the hinge structure 340, the second coupling portion 72a has a recess 342. The mounting plate member 80 is inserted into the recess 342, and the second coupling 72a and the mounting plate member 80 are joined together by welding, adhesion, or the like.

Figure 38:
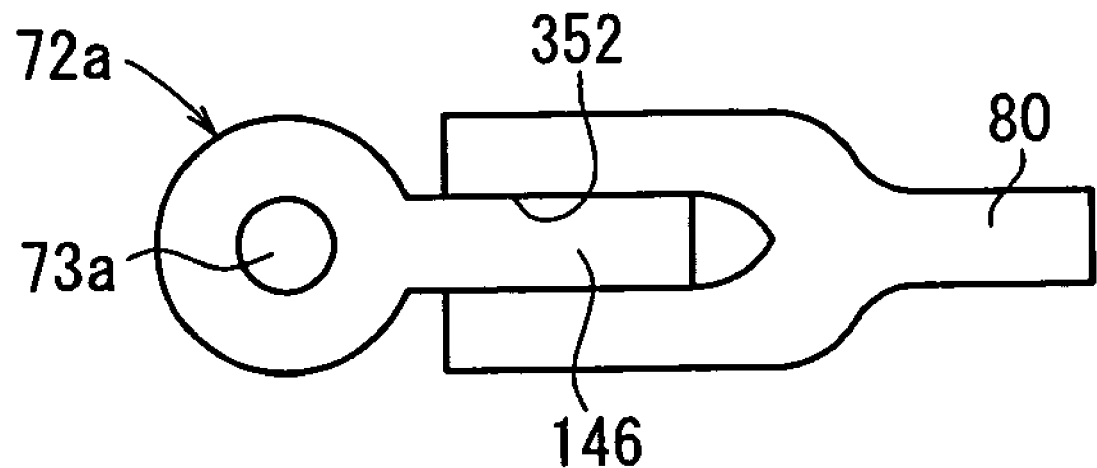
FIG. 38 is a side view schematically showing hinge structure of a fuel cell stack according to the 28th embodiment of the present invention.

FIG. 38 is a side view schematically showing hinge structure 350 of a fuel cell stack according to the 28th embodiment of the present invention.

In the hinge structure 350, the thin plate section 146 of the second coupling portion 72a is inserted into a recess 352 of the mounting plate member 80, and the second coupling portion 72a and the mounting plate member 80 are joined together by welding or adhesion.

Figure 39:
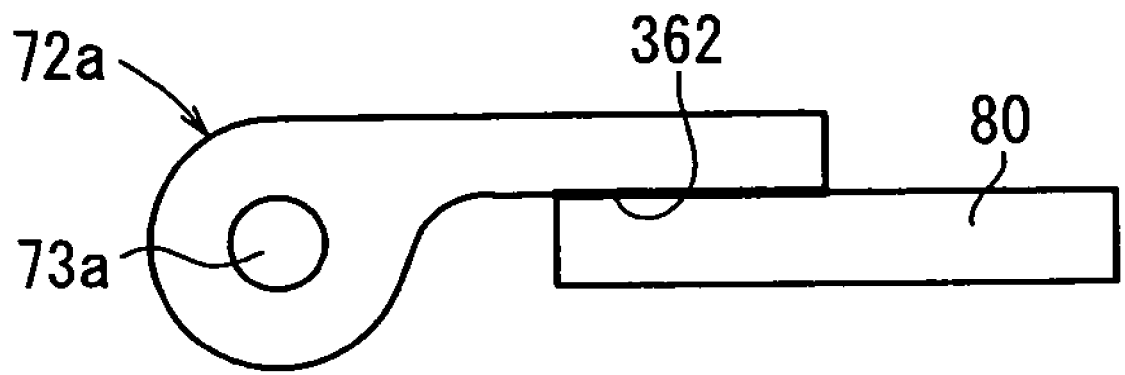
FIG. 39 is a side view schematically showing hinge structure of a fuel cell stack according to the 29th embodiment of the present invention.
Figure 40:
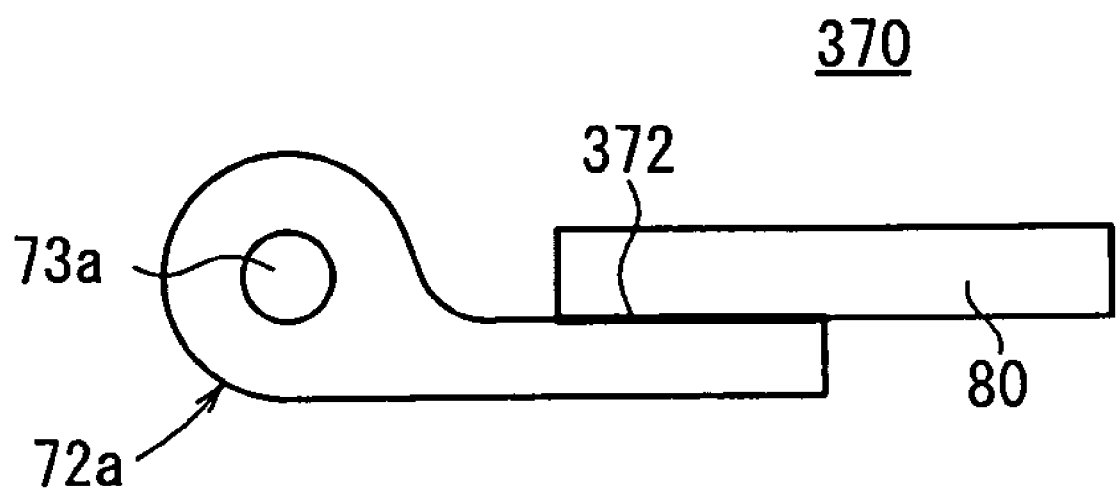
FIG. 40 is a side view schematically showing hinge structure of a fuel cell stack according to the 30th embodiment of the present invention.

FIG. 39 is a side view schematically showing hinge structure 360 of a fuel cell stack according to the 29th embodiment of the present invention. FIG. 40 is a side view schematically showing hinge structure 370 of a fuel cell stack according to the 30th embodiment of the present invention.

In the hinge structure 360, the mounting plate member 80 is joined to one surface 362 of the second coupling portion 72a by adhesion, welding, or the like. In the hinge structure 370, the second coupling portion 72a is joined to the other surface 372 of the second coupling portion 72a by adhesion, welding, or the like.

Figure 41:
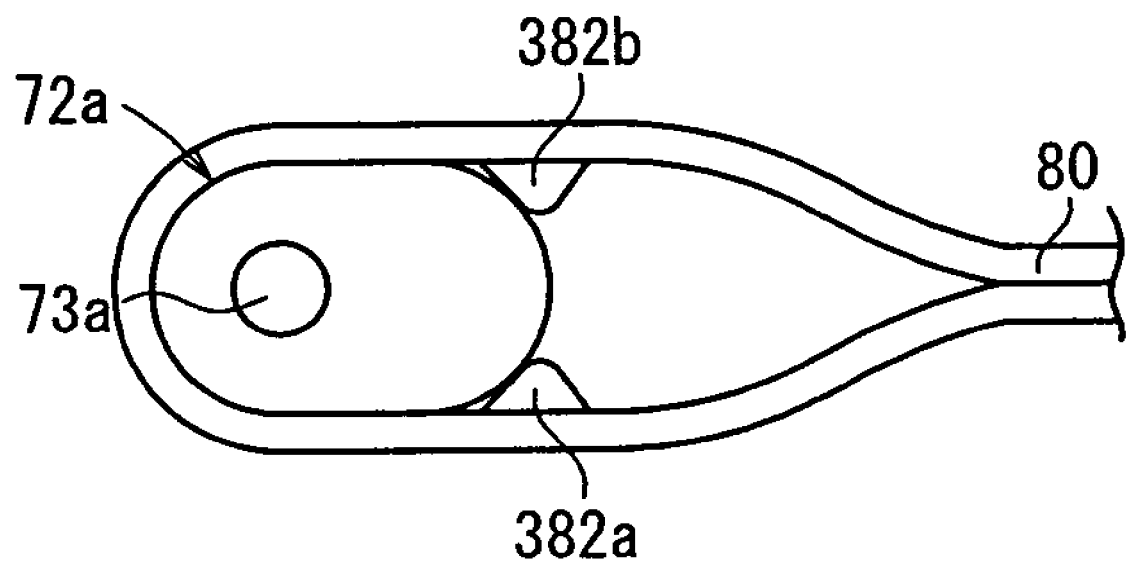
FIG. 41 is a side view schematically showing hinge structure of a fuel cell stack according to the 31st embodiment of the present invention.

FIG. 41 is a side view schematically showing hinge structure 380 of a fuel cell stack according to 31st embodiment of the present invention.

In the hinge structure 380, the mounting plate member 80 is curved around the second coupling portion 72a. Projections 382a, 382b are formed on the inner surface of the mounting plate member 80 for supporting the second coupling portion 72a.

Figure 42:
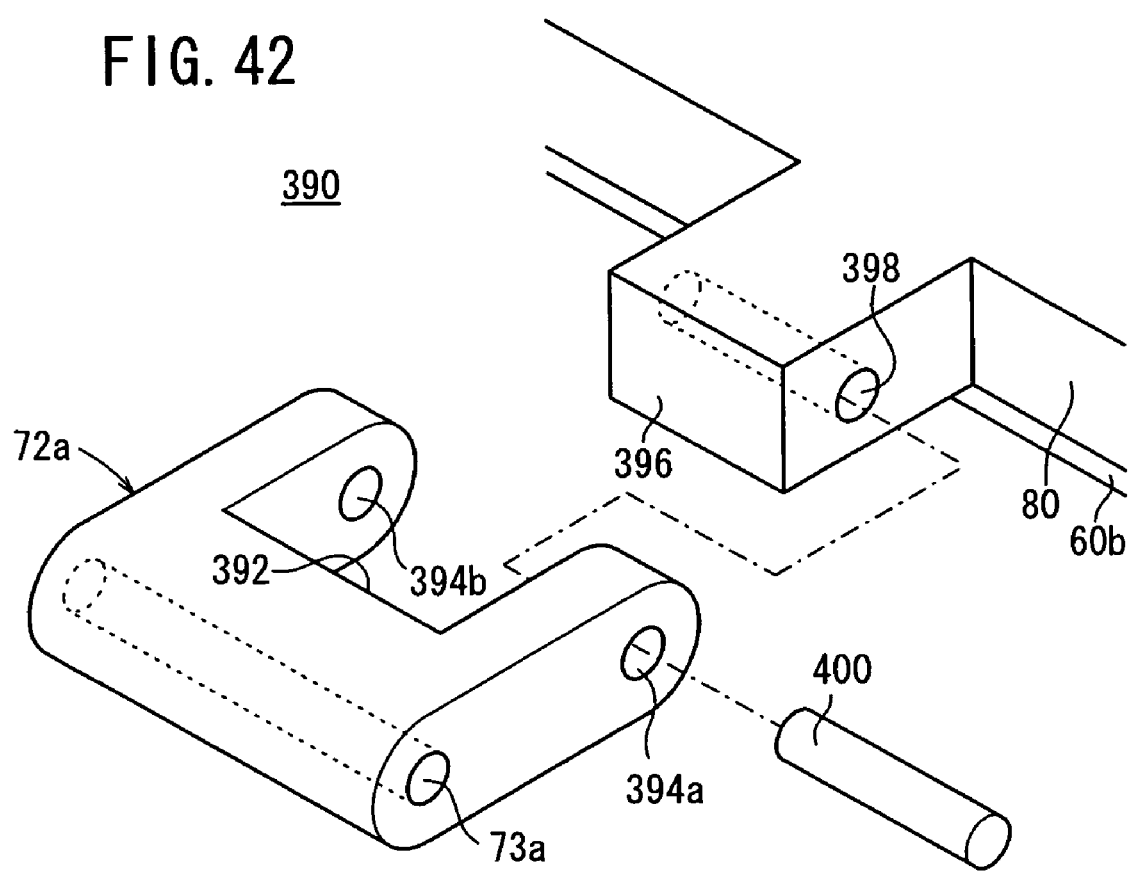
FIG. 42 is an exploded perspective view schematically showing hinge structure of a fuel cell stack according to the 32nd embodiment of the present invention.

FIG. 42 is an exploded perspective view schematically showing hinge structure 390 of a fuel cell stack according to the 32nd embodiment of the present invention.

In the hinge structure 390, a cutout portion 392 is formed in the second coupling portion 72a, and holes 394a, 394b are formed in parallel with the hole 73a, at opposite sides of the cutout portion 392. The mounting plate member 80 has an expansion 396 provided in the cutout portion 392. The expansion 396 has a hole 398 in alignment with the holes 394a, 394b.

In a state in which the expansion 396 is positioned in the cutout portion 392, a coupling pin 400 is inserted into the holes 394a, 394b, 398 under pressure. Thus, the second coupling portion 72a is joined to the mounting plate member 80.

Though not shown, in the second to 32nd embodiments, the separate second coupling portions 70a, 70b, 72b are provided in the side plates 60a, 60c, and 60d. Likewise, the separate first coupling portions 66a, 66c, 66b, and 66d may be provided in the end plates 20a, 20b.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell stack comprising a stack body formed by stacking a plurality of unit cells in a stacking direction, and a box-shaped casing containing said stack body, said unit cells each including an electrolyte electrode assembly and separators sandwiching said electrolyte electrode assembly, said electrolyte electrode assembly including a pair of electrodes, and an electrolyte interposed between said electrodes, said casing comprising:
end plates provided at opposite ends of said stack body in the stacking direction;
a plurality of side plates provided on sides of said stack body; and
coupling pins connecting said end plates and said side plates, wherein separate cylindrical insertion portions are fixed separately to at least one of said side plates and said end plates, for inserting one of said coupling pins into said cylindrical insertion portions; and
said fuel cell stack further comprising:
a mounting plate member, said cylindrical insertion portions being fixed separately to said mounting plate member, wherein said mounting plate member is at least fixed to said side plate or said end plate.

2. A fuel cell stack according to claim 1, wherein said cylindrical insertion portion is made of metal, non-metal, or resin.

3. A fuel cell stack according to claim 1, wherein said mounting plate member is at least thicker than said side plate.

4. A fuel cell stack according to claim 1, wherein said mounting plate member has an opening for engagement with said cylindrical insertion portion.

5. A fuel cell stack according to claim 1, wherein said mounting plate member has a deformed portion for engagement with said cylindrical insertion portion.

6. A fuel cell stack according to claim 1, further comprising a fixing member for fixing said cylindrical insertion portion to said mounting plate member.

7. A fuel cell stack according to claim 1, wherein said cylindrical insertion portion has a projection inserted into said mounting plate member.

* * * * *